US011023090B2

(12) United States Patent
Xu et al.

(10) Patent No.: US 11,023,090 B2
(45) Date of Patent: Jun. 1, 2021

(54) METHOD AND SMART WATCH FOR DISPLAYING SCHEDULE TAGS

(71) Applicant: SAMSUNG ELECTRONICS CO., LTD., Suwon-si (KR)

(72) Inventors: Li Xu, Tianjin (CN); Pengyu Li, Tianjin (CN); Zhe Zhao, Tianjin (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 15/531,890

(22) PCT Filed: Dec. 14, 2015

(86) PCT No.: PCT/KR2015/013666
§ 371 (c)(1),
(2) Date: May 31, 2017

(87) PCT Pub. No.: WO2016/099097
PCT Pub. Date: Jun. 23, 2016

(65) Prior Publication Data
US 2017/0269792 A1    Sep. 21, 2017

(30) Foreign Application Priority Data

Dec. 18, 2014 (CN) .......................... 201410796026.1

(51) Int. Cl.
*G06F 3/0481* (2013.01)
*G06Q 10/10* (2012.01)
(Continued)

(52) U.S. Cl.
CPC ............ *G06F 3/0481* (2013.01); *G06F 3/048* (2013.01); *G06F 3/0412* (2013.01);
(Continued)

(58) Field of Classification Search
None
See application file for complete search history.

(56) References Cited

U.S. PATENT DOCUMENTS 6,075,755 A * 6/2000 Zarchan ................ A61J 7/0481
368/10
6,477,117 B1   11/2002 Narayanaswami et al.
(Continued)

FOREIGN PATENT DOCUMENTS

CN    101001427 A    7/2007
CN    101217727 A    7/2008
(Continued)

OTHER PUBLICATIONS

International Search Report and Written Opinion dated Mar. 24, 2016, issued by the International Searching Authority in counterpart International Application No. PCT/KR2015/013666 (PCT/ISA/210 & PCT/ISA/237).
(Continued)

*Primary Examiner* — Christopher J Fibbi
(74) *Attorney, Agent, or Firm* — Sughrue Mion, PLLC

(57) ABSTRACT

Provided is a method of notifying a schedule by using a mobile terminal, the method including obtaining schedule information indicating a schedule of a user; generating at least one schedule tag based on time information comprised in the schedule information of the user; displaying a clock graphical user interface (GUI) on a screen of the mobile terminal; displaying the schedule tag on a periphery of the displayed clock GUI, based on the time information corresponding to the schedule tag; and changing and displaying an attribute of the displayed schedule tag, according to the time information corresponding to the displayed schedule tag, and current time.

19 Claims, 31 Drawing Sheets

(51) Int. Cl.
    *G06F 3/048* (2013.01)
    *G06F 3/0488* (2013.01)
    *H04M 1/725* (2021.01)
    *G06F 3/041* (2006.01)
    *H04W 8/18* (2009.01)
    *H04W 68/00* (2009.01)

(52) U.S. Cl.
    CPC ....... *G06F 3/0488* (2013.01); *G06Q 10/1093* (2013.01); *H04M 1/725* (2013.01); *H04W 8/18* (2013.01); *H04W 68/005* (2013.01)

(56) References Cited

U.S. PATENT DOCUMENTS

| | | | |
|---|---|---|---|
| 8,311,621 | B2 | 11/2012 | Hatakeyama |
| 8,713,459 | B2 * | 4/2014 | Yanchar ................ G06F 40/134 715/763 |
| 8,902,715 | B2 | 12/2014 | Tu et al. |
| 2003/0007420 | A1 * | 1/2003 | Shteyn ................... G04G 11/00 368/10 |
| 2009/0016168 | A1 * | 1/2009 | Smith ..................... G04G 9/02 368/10 |
| 2011/0202883 | A1 * | 8/2011 | Oh ........................ G06F 3/0481 715/846 |
| 2012/0066629 | A1 * | 3/2012 | Lee ..................... G06F 3/04847 715/769 |
| 2012/0238832 | A1 | 9/2012 | Jang et al. |
| 2013/0170324 | A1 * | 7/2013 | Tu .......................... G04G 21/08 368/28 |
| 2014/0219066 | A1 * | 8/2014 | Sadilek ............... G06F 3/04886 368/82 |
| 2014/0347289 | A1 | 11/2014 | Suh et al. |
| 2014/0347491 | A1 | 11/2014 | Connor |
| 2015/0346983 | A1 * | 12/2015 | Adler ................ H04M 1/72572 715/772 |
| 2015/0378320 | A1 * | 12/2015 | Knight ................. G04G 13/026 368/107 |
| 2016/0042324 | A1 * | 2/2016 | Johnson ............. G06Q 10/1095 705/7.19 |
| 2017/0212478 | A1 * | 7/2017 | Basargin ............... G04G 9/0064 |

FOREIGN PATENT DOCUMENTS

| | | |
|---|---|---|
| CN | 201114423 Y | 9/2008 |
| CN | 101702127 A | 5/2010 |
| CN | 102360472 A | 2/2012 |
| CN | 103369146 A | 10/2013 |
| KR | 100573849 B1 | 4/2006 |
| KR | 10-2011-0013652 A | 2/2011 |
| KR | 1020130070633 A | 6/2013 |
| KR | 101377957 B1 | 3/2014 |
| KR | 1020140119532 A | 10/2014 |
| KR | 1020140137170 A | 12/2014 |

OTHER PUBLICATIONS

Communication dated May 25, 2017, issued by the State Intellectual Property Office of the People's Republic of China in counterpart Chinese Patent Application No. 201410796026.1.
Wikipedia: "Smartwatch", Dec. 17, 2014, XP055416604, Retrieved from the Internet: URL: https://en.wikipedia.org/w/index.php?title=Smartwatch&oldid=638527633, (9 pages total).
Wikipedia: "Apple Watch", Dec. 14, 2014, XP055416814, Retrieved from the Internet: URL: https://en.wikipedia.org/w/index.php?title=Apple_Watch&oldid=638043719, (6 pages total).
Miguel A Labrador et al: "Location-Based Information Systems: Developing Real-Time Tracking Applications", Oct. 21, 2010, Chapman and Hall/CRC, XP055342880, (34 pages total).
Robert Istepanian et al: "M-Health: Emerging Mobile Health Systems", Nov. 16, 2005, Springer, XP055406721, (218 pages total).
Dslam: "My Mega Yes Watch Review—(Lots of Pix!)", Internet Article, Mar. 10, 2010, XP055416630, Retrieved from the Internet: URL: https://forums.watchuseek.com/f67/my-me-ga-yes-watch-review-lots-pix-373061.html, (23 pages total).
Communication dated Oct. 30, 2017, issued by the European Patent Office in counterpart European Application No. 15870264.7.
Wikipedia, "Samsung Gear 2", Internet Article, Oct. 22, 2014, retrieved from the Internet: URL:https://en.wikipedia.org/w/index.php?title=Samsung_Gear_2&oldid=630701431 [retrieved on Jul. 1, 2019], XP055601213. (3 pages total).
Android Authority, "Moto 360 Review: Trying to round out the edges", YouTube video, Sep. 17, 2014, retrieved from the Internat: URL: https://www.youtube.com/watch?v=7ZEGb-MQVh4&feature=youtu.be [retrieved on Jul. 2, 2019], XP055601599. (3 pages total).
Communication dated Jul. 10, 2019 issued by the European Patent Office in counterpart European Patent Application No. 15870264.7.
Communication dated Jan. 14, 2020 by the European Patent Office in counterpart European Patent Application No. 15870264.7.
Communication dated Sep. 8, 2020, issued by the European Patent Office in European Application No. 15870264.7.
Communication dated Mar. 23, 2017, issued by the China National Intellectual Property Administration in Chinese Application No. 201410796026.1.
Communication dated Sep. 15, 2017, issued by the China National Intellectual Property Administration in Chinese Application No. 201410796026.1.

* cited by examiner

METHOD AND SMART WATCH FOR DISPLAYING SCHEDULE TAGS

TECHNICAL FIELD

The present disclosure relates to a mobile terminal and a method of displaying a schedule and providing a notification about the schedule by using the mobile terminal.

BACKGROUND ART

With recent rapid developments in mobile terminals, more functions, e.g., a voice communication function, a camera function, a multimedia player function, a payment function, etc., are being included in a mobile terminal. In particular, with continuous developments in intelligent operating systems, user-customized devices and systems are being developed.

Due to the recent fast pace of life, people have more requirements about managing their own schedules, and thus there is an increasing demand for a method of managing and notifying schedules, the method efficiently using a limited display area of a mobile terminal.

Recently, demand for a smart watch that is a terminal in the form of a wrist watch has been increasing. In this regard, the smart watch refers to a system-embedded wrist watch having further advanced functions than those of a general watch, and performs functions of a smartphone by having a mobile operating system installed therein.

DETAILED DESCRIPTION OF THE INVENTION

Technical Problem

Provided are a mobile terminal capable of clearly displaying schedule information according to time, and a method of notifying a schedule by using the mobile terminal.

Technical Solution

According to an aspect, there is provided a method of notifying a schedule by using a mobile terminal, the method including obtaining schedule information indicating a schedule of a user; generating at least one schedule tag based on time information included in the schedule information of the user; displaying a clock graphical user interface (GUI) on a screen of the mobile terminal; displaying the schedule tag on a periphery of the displayed clock GUI, based on the time information corresponding to the schedule tag; and changing and displaying an attribute of the displayed schedule tag, according to the time information corresponding to the displayed schedule tag, and current time.

The schedule tag may be differently displayed according to whether time corresponding to the schedule tag is morning or afternoon.

The schedule tag may be displayed on a part of the periphery of the clock GUI, the part corresponding to time that corresponds to the schedule tag.

When the schedule tag is selected by the user, the method may further include displaying detailed schedule information corresponding to the schedule tag.

The changing and displaying of the attribute of the schedule tag may include changing and displaying at least one of a shape, a size, a color, and brightness of the schedule tag, according to a type of the schedule corresponding to the schedule tag.

The changing and displaying of the attribute of the schedule tag may include changing and displaying the attribute of the schedule tag when the current time is in a preset range of a time section corresponding to the displayed schedule tag.

The changing and displaying of the attribute of the schedule tag may include sequentially changing the attribute of the schedule tag when the current time approaches a start point of the time section corresponding to the displayed schedule tag.

At least one of a color, a shape, and brightness of at least one of an hour hand, a minute hand, and a background image included in the clock GUI may be changed and displayed according to the time information corresponding to the displayed schedule tag, and the current time.

The method may further include transmitting the schedule information corresponding to the schedule tag to an external device having preset authority, according to the time information corresponding to the displayed schedule tag, and the current time.

The method may further include outputting a preset notification, according to the time information corresponding to the displayed schedule tag, and the current time.

In this regard, the notification may include at least one of a visual notification, an acoustic notification, and a tactile notification.

The outputting of the notification may include sensing at least one of a current state of the user and an environment state of the mobile terminal; and changing an attribute of the notification, based on at least one of the current state of the user and the environment state of the mobile terminal.

The changing and displaying of the attribute of the schedule tag may include sensing a current location of the mobile terminal; determining a movement path and a travel time from the current location of the mobile terminal to an appointment place, based on appointment place information corresponding to the schedule tag; determining time of changing and displaying the attribute of the schedule tag, based on the determined travel time; and changing and displaying the attribute of the displayed schedule tag, according to the determined time.

The obtaining of the schedule information may include at least one of receiving the schedule information from an external device, receiving an input of the schedule information from the user, and receiving an input of the schedule information from a schedule application.

The generating of the at least one schedule tag may include obtaining a schedule change request signal with respect to the schedule information; changing the schedule tag, based on the schedule change request signal; and displaying the changed schedule tag on the periphery of the clock GUI, based on time information corresponding to the changed schedule tag.

The method may further include displaying a first schedule tag generated based on time information included in first schedule information of the user, and then obtaining second schedule information of the user from a mobile terminal of another user which has pre-determined authority; generating at least one second schedule tag, based on time information included in the second schedule information of the user; and displaying the second schedule tag on the periphery of the displayed clock GUI, based on the time information corresponding to the second schedule tag.

The second schedule tag and the first schedule tag may be displayed on different locations.

When the second schedule tag is selected by the user, the method may further include displaying detailed schedule information corresponding to the second schedule tag, wherein the detailed schedule information includes a sender of the second schedule information, time of the second schedule tag, and content of the second schedule tag.

The method may further include determining whether time corresponding to the first schedule tag and time corresponding to the second schedule tag overlap each other; and changing an attribute of the second schedule tag when the time corresponding to the first schedule tag and the time corresponding to the second schedule tag overlap each other.

The clock GUI may be one of an analog clock GUI, a digital clock GUI, and another clock GUI.

According to another aspect, there is provided a mobile terminal for notifying a schedule, the mobile terminal including a communication unit configured to obtain schedule information indicating a schedule of a user; a controller configured to generate at least one schedule tag based on time information included in the schedule information of the user, and a display unit configured to display a clock graphical user interface (GUI) on a screen of the mobile terminal, to display the schedule tag on a periphery of the displayed clock GUI, based on the time information corresponding to the schedule tag, and to change and display an attribute of the displayed schedule tag, according to the time information corresponding to the displayed schedule tag, and current time.

The controller may be further configured to display detailed schedule information when the schedule tag is selected by the user.

The controller may be further configured to change and display at least one of a shape, a size, a color, and brightness of the schedule tag, according to a type of the schedule corresponding to the schedule tag.

The controller may be further configured to change and display the attribute of the schedule tag when the current time is included in a preset range of a time section corresponding to the displayed schedule tag.

The controller may be further configured to sequentially change the attribute of the schedule tag when the current time approaches a start point of the time section corresponding to the displayed schedule tag.

The controller may be further configured to change and display at least one of a color, a shape, and brightness of at least one of an hour hand, a minute hand, and a background image included in the clock GUI, according to the time information corresponding to the displayed schedule tag, and the current time.

The controller may be further configured to transmit the schedule information corresponding to the schedule tag to an external device having preset authority, according to the time information corresponding to the displayed schedule tag, and the current time.

The controller may be further configured to output a preset notification, according to the time information corresponding to the displayed schedule tag, and the current time.

In this regard, the notification may include at least one of a visual notification, an acoustic notification, and a tactile notification.

The controller may be further configured to sense at least one of a current state of the user and an environment state of the mobile terminal, and to change an attribute of the notification, based on at least one of the current state of the user and the environment state of the mobile terminal.

The controller may be further configured to sense a current location of the mobile terminal, to determine a movement path and a travel time from the current location of the mobile terminal to an appointment place, based on appointment place information corresponding to the schedule tag, to determine time of changing and displaying the attribute of the schedule tag, based on the determined travel time; and to change and display the attribute of the displayed schedule tag, according to the determined time.

The communication unit may be further configured to receive the schedule information from an external device, to receive an input of the schedule information from the user, or to receive an input of the schedule information from a schedule application.

The controller may be further configured to obtain a schedule change request signal requesting to change the schedule information, to change the schedule tag, based on the schedule change request signal, and to display the changed schedule tag on the periphery of the clock GUI, based on time information corresponding to the changed schedule tag.

The controller may be further configured to display a first schedule tag generated based on time information included in first schedule information of the user, and then obtaining second schedule information of the user from a mobile terminal of another user which has pre-determined authority, to generate at least one second schedule tag, based on time information included in the second schedule information of the user, and to display the second schedule tag on the periphery of the displayed clock GUI, based on the time information corresponding to the second schedule tag.

The display unit may be further configured to display the second schedule tag and the first schedule tag on different locations.

The controller may be further configured to display detailed schedule information corresponding to the second schedule tag when the second schedule tag is selected by the user, wherein the detailed schedule information includes a sender of the second schedule information, time of the second schedule tag, and content of the second schedule tag.

The controller may be further configured to determine whether time corresponding to the first schedule tag and time corresponding to the second schedule tag overlap each other, and to change an attribute of the second schedule tag when the time corresponding to the first schedule tag and the time corresponding to the second schedule tag overlap each other.

According to another aspect, there is provided a non-transitory computer-readable recording medium having recorded thereon a program for executing one of the methods, by using a computer.

Advantageous Effects

According to an embodiment, a user may easily check schedules according to flow of time.

According to another embodiment, a user may clearly recognize a schedule according to a notification that is variously output as schedule start time approaches.

According to another embodiment, a schedule of another user may be easily shared with a user in a manner that schedule information received from a terminal of the other user is displayed. In addition, a schedule of the other user, which is an object of interest, may be clearly managed.

MODE OF THE INVENTION

Figure 1:
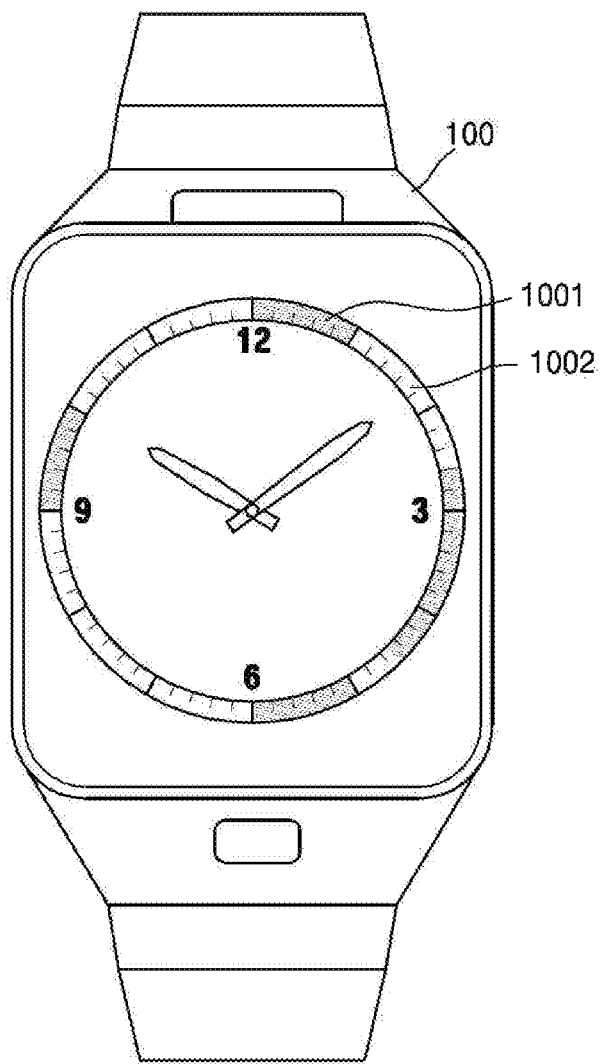
FIG. 1 is a diagram illustrating a mobile terminal that displays and notifies a schedule, according to an embodiment.

The present disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. In the following description, well-known functions or constructions are not described in detail since they would obscure the disclosure with unnecessary detail. Throughout the specification, like reference numerals in the drawings denote like elements.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

In the detailed description, in particular, in claims, the use of the term "the" and similar indicating terms may correspond to singular and plural forms. Also, an order of operations performed by the methods according to the present disclosure may be changed unless there is a particular description about the order of operations. Thus, the present disclosure is not limited to the order of operations.

The expression "some embodiments" or "an embodiment" which is mentioned several times throughout the specification does not necessarily indicate the same embodiment.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Reference will now be made in detail to embodiments, examples of which are illustrated in the accompanying drawings.

FIG. 1 illustrates a mobile terminal 100 that displays and notifies a schedule, according to an embodiment.

The mobile terminal 100 disclosed in the present embodiment may include a mobile phone, a smartphone, a notebook computer, a terminal for digital broadcasting, a personal digital assistant (PDA), a portable multimedia player (PMP), a camera, navigation, a tablet computer, an electronic book (e-book) terminal, a smart watch, or the like. Hereinafter, throughout the specification, it is assumed that the mobile terminal 100 is a smart watch.

According to the present embodiment, a method of displaying and notifying a schedule, the method being performed by the mobile terminal 100, may be provided.

Referring to FIG. 1, the mobile terminal 100 may display a clock graphical user interface (GUI). The mobile terminal 100 may display a schedule tag on a periphery of the clock GUI.

A schedule tag may be used as a means of displaying existence of a schedule. Based on time on which the schedule tag is displayed, a user may easily check a timeslot in which the schedule is present.

The schedule tag may be generated based on schedule information. For example, based on the schedule information indicating that a team meeting will be from 11:30 a.m. to 1:00 p.m., the schedule tag may be generated. The schedule tag may be generated to correspond to the schedule information.

A shape of a schedule tag may be determined based on time included in schedule information corresponding to the schedule tag. The shape of the schedule tag may be determined based on a shape of the clock GUI. For example, referring to FIG. 1, a shape of a schedule tag displayed between twelve to one o'clock may be different from a shape of a schedule tag displayed between one to three o'clock. For example, the schedule tag displayed between twelve to one o'clock may have a trapezoidal shape, and the schedule tag displayed between one to three o'clock may have a curved shape. However, the disclosure is not limited thereto.

The schedule tag may be expressed as an image. The schedule tag may be expressed as a moving image. The schedule tag may be expressed as sequential images. The schedule tag may be expressed by using a point, a line, and a side. The schedule tag may be expressed as a picture, a photo, or the like. The schedule tag may be changed according to a preset event. The schedule tag may be expressed as an image designated by a user.

The schedule tag may be displayed on a periphery of the clock GUI, thereby displaying existence of a schedule. The schedule tag may be displayed to correspond to time displayed on the clock GUI. For example, the schedule tag corresponding to a schedule time between one to three o'clock may be displayed at a part of the clock GUI, the part indicating time between one to three o'clock.

When the clock GUI includes a clock dial, the periphery of the clock dial may correspond to 12 hours. A schedule tag having a length corresponding to a part of the periphery of the clock dial may be attached on the periphery of the clock, based on schedule start time and schedule end time. The user may conveniently recognize start time and end time of a schedule corresponding to the schedule tag, based on a timeslot of the schedule tag displayed on the periphery of the clock dial.

The schedule tag may be generated in a time unit. The schedule tag may be generated in a unit of minutes. The schedule tag may be generated in a unit of hours. For example, the schedule tag may show schedule time corresponding to one hour and thirty minutes.

The schedule tag may be generated based on an analog clock. The schedule tag may be generated based on a circular-shape analog clock. The schedule tag may be displayed on the periphery of the clock GUI that displays time in a manner that sixty dots or lines dividing a circumference are each one minute, and twelve numbers are at evenly spaced intervals.

The clock GUI may include, but is not limited to, an analog clock form and a digital clock form. The clock GUI may include the clock dial, and the clock dial may include a dial with markings and a dial with numbers.

The mobile terminal 100 may display a schedule tag on the periphery of the clock GUI, based on time information corresponding to the schedule tag. For example, a part 1001, in which a schedule tag is displayed, and a part 1002, in which the schedule tag is not displayed, are distinguished therebetween on the periphery of the clock GUI of FIG. 1. The user may easily recognize time at which a schedule is set, according to a visual effect of the schedule tag.

The mobile terminal 100 may notify existence of a schedule to the user by changing an attribute of the schedule tag. The mobile terminal 100 may change the attribute of the schedule tag, based on time information corresponding to the schedule tag. When schedule start time corresponding to the schedule tag approaches, the mobile terminal 100 may change the attribute of the schedule tag. The mobile terminal 100 may change the attribute of the schedule tag according to preset time. The mobile terminal 100 may change the attribute of the schedule tag according to an environment. The mobile terminal 100 may change the attribute of the schedule tag according to a physical state of the user.

The attribute of the schedule tag may be, but is not limited to, a shape, a color, brightness, a level of opacity, a form, or flicker of the schedule tag.

Figure 2:
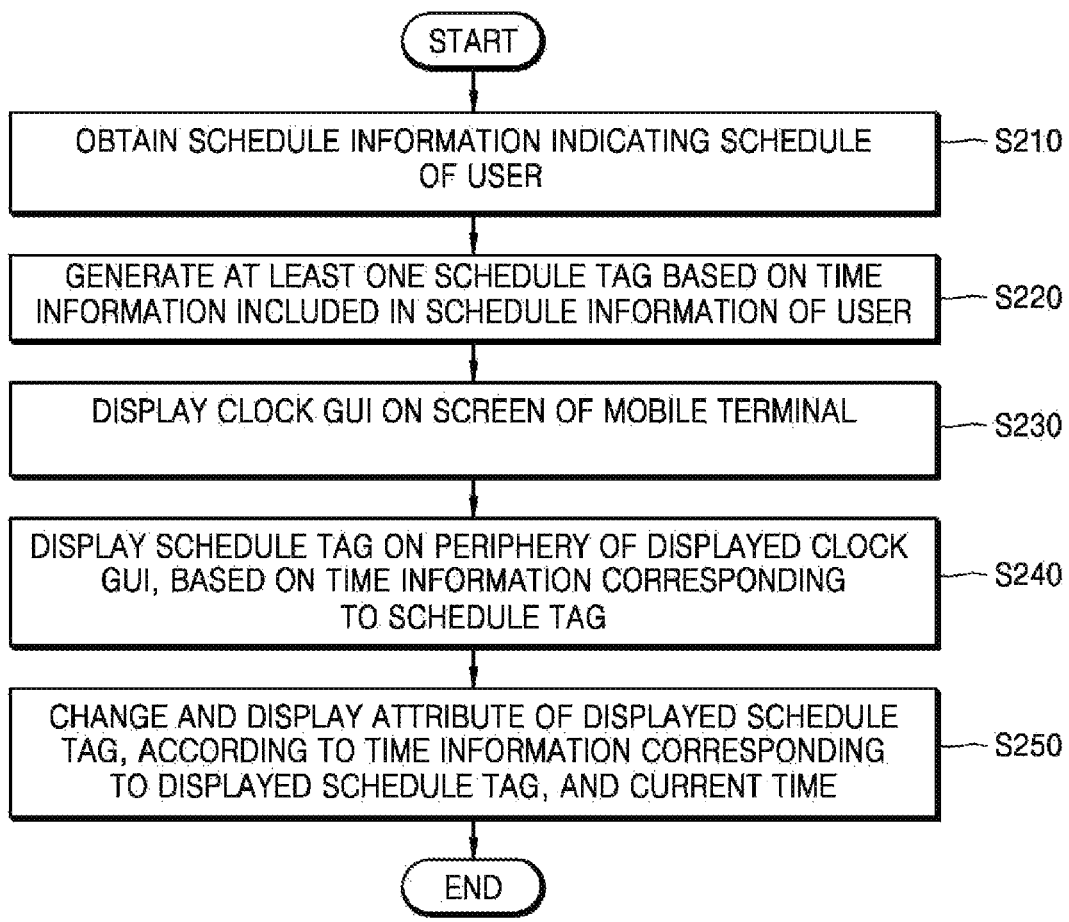
FIG. 2 illustrates a flowchart of a method of notifying a schedule by using the mobile terminal, according to an embodiment.

FIG. 2 illustrates a flowchart of a method of notifying a schedule by using the mobile terminal 100, according to an embodiment.

In operation S210, the mobile terminal 100 may obtain schedule information indicating a schedule of a user.

The schedule information of the user may include, but is not limited to, a schedule location, a schedule type, schedule time, contact information of a person associated with a schedule, a schedule priority, or the like.

The mobile terminal 100 may obtain the schedule information of the user from a server, an external device, a user input, or the like.

In operation S220, the mobile terminal 100 may generate at least one schedule tag based on time information included in the schedule information of the user.

The schedule tag may be generated based on the schedule information of the user. According to the number of schedules of the user, at least one schedule tag may be generated.

A shape of the schedule tag may vary according to time of the schedule information. When the schedule information corresponds to a preset event, the schedule tag may be generated with a preset shape.

The mobile terminal 100 may generate the schedule tag by distinguishing between a case in which schedule time is in the morning and a case in which schedule time is in the afternoon. For example, a color of the case in which schedule time is in the morning may be different from a color of the case in which schedule time is in the afternoon. A display shape is not limited thereto.

In operation S220, the mobile terminal 100 may display the clock GUI on its screen.

The clock GUI may be displayed on the screen of the mobile terminal 100, thereby showing current time to the user. The clock GUI may include an analog-form clock, a digital-form clock, and other-form clocks. The analog-form clock may mean a clock dial. The clock dial may include an hour hand, a minute hand, and a clock index. However, a form of the clock GUI is not limited thereto.

In operation S230, the mobile terminal 100 may display the schedule tag on the periphery of the displayed clock GUI, based on the time information corresponding to the schedule tag.

According to the present embodiment, the periphery of the clock GUI may indicate an area of the clock GUI other than an area for displaying time. For example, a periphery of an analog clock GUI may indicate areas excluding an hour hand and a minute hand.

The mobile terminal 100 may display the schedule tag on a part of the periphery of the clock GUI, the part corresponding to time that corresponds to the schedule tag. For example, the schedule tag corresponding to a lunch appointment between 12:00 p.m. and 1:00 p.m. may be displayed on a part of the periphery of the clock GUI, the part being between the number 12 and the number 1.

The mobile terminal 100 may change a shape of the schedule tag according to a shape of the clock GUI, and may display the schedule tag. For example, when the shape of the clock GUI is a quadrangle, a shape of a schedule tag displayed on a corner of the quadrangle may be different from a shape of a schedule tag displayed on a side of the quadrangle.

In operation S240, the mobile terminal 100 may display the schedule tag on the periphery of the displayed clock GUI, based on the time information corresponding to the schedule tag.

The mobile terminal 100 may arrange schedule tags according to a plurality of pieces of time information corresponding to the schedule tags. The mobile terminal 100 may arrange the schedule tags according to the plurality of pieces of time information corresponding to the schedule tags in a time sequence. The mobile terminal 100 may display the arranged schedule tags on the periphery of the clock GUI.

For example, when schedule start time corresponding to the schedule tag is between 12:00 p.m. and 1:00 p.m., the mobile terminal 100 may display the schedule tag on a part of the clock GUI, the part being between 12:00 p.m. and 1:00 p.m. The user may recognize that there is a schedule between 12:00 p.m. and 1:00 p.m., according to the schedule tag displayed on a screen of the mobile terminal 100.

The mobile terminal 100 may display the schedule tag according to schedule time corresponding to the schedule tag. The mobile terminal 100 may display schedule tags by distinguishing between a case in which schedule time is in the morning and a case in which schedule time is in the afternoon. For example, the mobile terminal 100 may differently display a color of a schedule tag generated based on schedule information between 6:00 a.m. and 11:00 a.m., and a color of a schedule tag generated based on schedule information between 6:00 p.m. and 11:00 p.m. However, the present disclosure is not limited thereto. On the other hand, when a schedule tag continues from the morning to the afternoon, the mobile terminal 100 may not differently display a color of the schedule tag. For example, a schedule tag generated based on schedule information between 11:00 a.m. and 1:00 p.m. may be displayed with one attribute.

In operation S250, the mobile terminal 100 may change and display an attribute of the displayed schedule tag, according to the time information corresponding to the displayed schedule tag, and current time.

The attribute of the schedule tag may be, but is not limited to, at least one of brightness, a color, a shape, a size, a form, shade, and a level of opacity of the schedule tag.

The mobile terminal 100 may change and display the attribute of the schedule tag so as to notify the schedule information to the user. When the schedule time approaches, the mobile terminal 100 may change and display the attribute of the schedule tag. When schedule start time approaches, the mobile terminal 100 may change and display the attribute of the schedule tag. The mobile terminal 100 may sequentially change and display the attribute of the schedule tag.

According to a type of a schedule corresponding to the schedule tag, the mobile terminal 100 may change at least one of a shape, a size, a color, and brightness of the schedule tag, and may display the schedule tag. The attribute of the schedule tag which is changed according to the type of the schedule may be preset by the user.

The mobile terminal 100 may change and display at least one of a color, a shape, and brightness of at least one of an hour hand, a minute hand, and a background image included in the clock GUI, according to the time information corresponding to the displayed schedule tag, and current time. In this regard, the time information corresponding to the schedule tag may include at least one of schedule start time and end time included in the schedule information.

The mobile terminal 100 may determine start time at which the schedule starts, based on the time information corresponding to the displayed schedule tag. When current time approaches the schedule start time, the mobile terminal 100 may change and display the attribute of the schedule tag.

When the current time corresponds to preset notification time, the mobile terminal 100 may change and display the attribute of the schedule tag. The preset notification time may refer to preset time to notify existence of the schedule before the schedule starts. The preset notification time may be set by the user or the mobile terminal 100.

For example, when the current time approaches the schedule start time corresponding to the schedule tag, the mobile terminal 100 may increase brightness of the schedule tag. In addition, when the schedule start time approaches, the mobile terminal 100 may display the schedule tag with maximum brightness. However, the present disclosure is not limited thereto.

When the attribute of the schedule tag is changed and then is displayed, the user may recognize that there is the schedule. When the attribute of the schedule tag is sequentially changed, the user may recognize that the schedule start time approaches further. Since the user recognizes that the attribute of the schedule tag is changed according to current time and the schedule start time, the user may easily manage the schedule.

Figure 3:
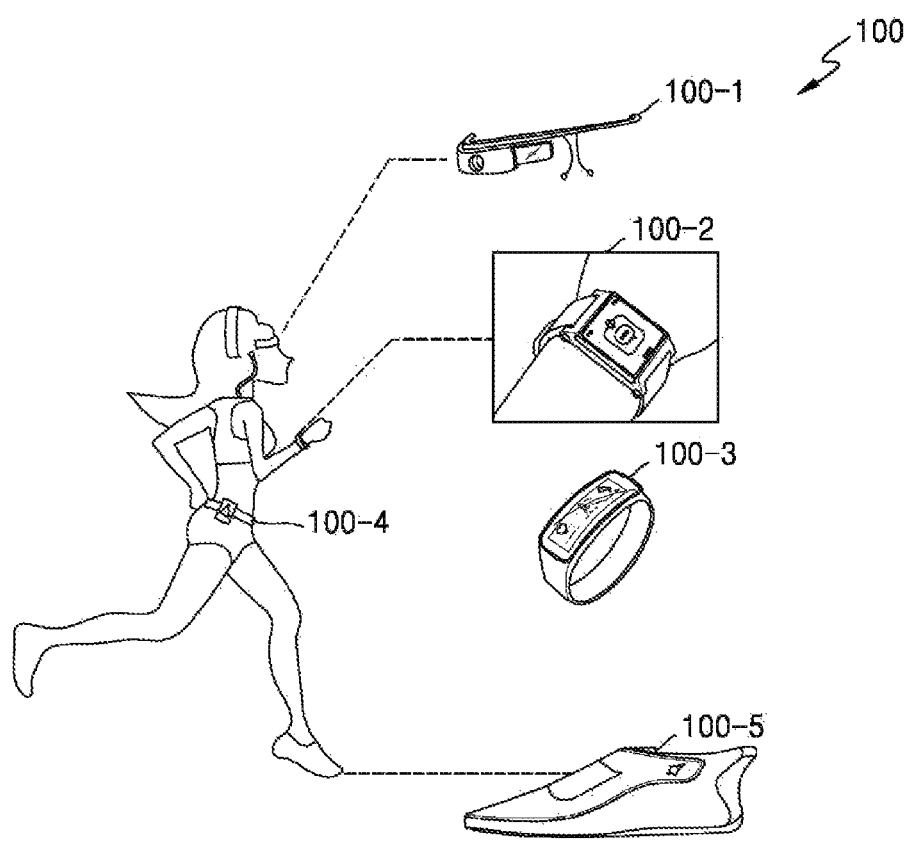
FIG. 3 is a diagram illustrating types of the mobile terminal, according to an embodiment.

FIG. 3 illustrates types of the mobile terminal 100, according to an embodiment.

According to the present embodiment, the mobile terminal 100 may refer to a device having a display unit that displays the clock GUI and a schedule tag. However, the present disclosure is not limited thereto.

According to the present embodiment, the mobile terminal 100 may refer to a wearable device that a user uses by wearing the wearable device on a body of the user.

For example, the mobile terminal 100 may be embodied as glasses 100-1, a watch 100-2, a band 100-3, a waist band 100-4, or shoes 100-5 which may be worn on the body of the user. However, the present disclosure is not limited thereto, and the mobile terminal 100 may be embodied as a hair band, earphones, or the like which may be worn on the body of the user. Thus, the user may freely live wearing the mobile terminal 100.

When the user lives wearing the mobile terminal 100, the mobile terminal 100 may collect information about a current state of the user. For example, the mobile terminal 100 may collect, by using an acceleration sensor, information about a movement speed, acceleration, and a movement distance of a current user. Alternatively, the mobile terminal 100 may collect information about a body temperature of the current user by using a temperature sensor. Alternatively, the mobile terminal 100 may collect information about blood pressure by using a blood pressure measuring sensor, or may collect information about an electrocardiogram by using an electrocardiogram measuring sensor, but the present disclosure is not limited thereto.

The mobile terminal 100 may output, to the user, the information in various forms including an image, voice, vibration, flickering of light, etc., the information being processed by the mobile terminal 100.

Figure 4:
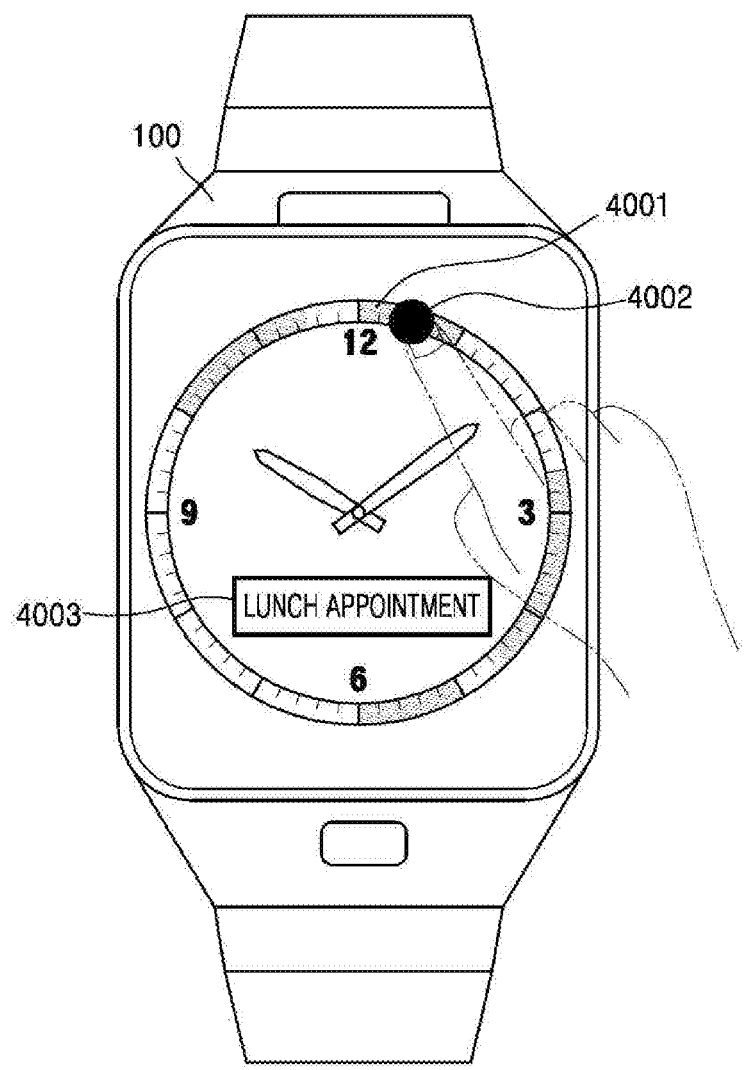
FIGS. 4, 5, and 6 are diagrams illustrating a screen of the mobile terminal which displays detailed schedule information, according to an embodiment.
Figure 5:
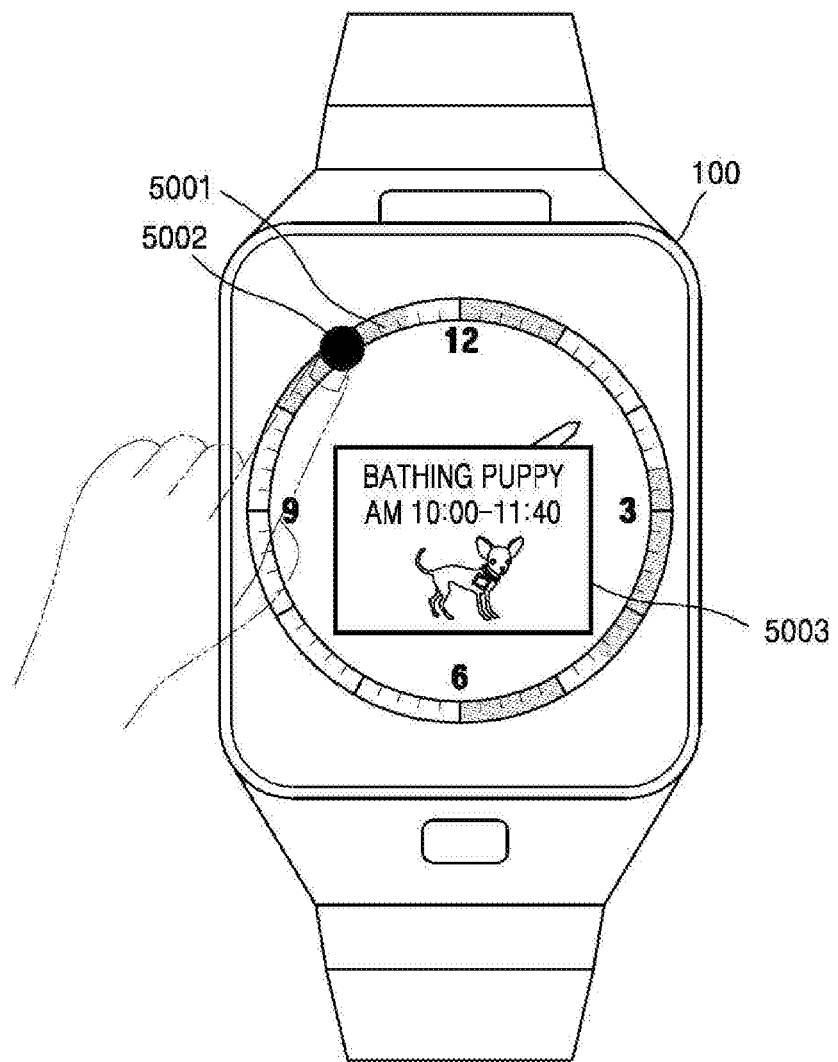
Figure 6:
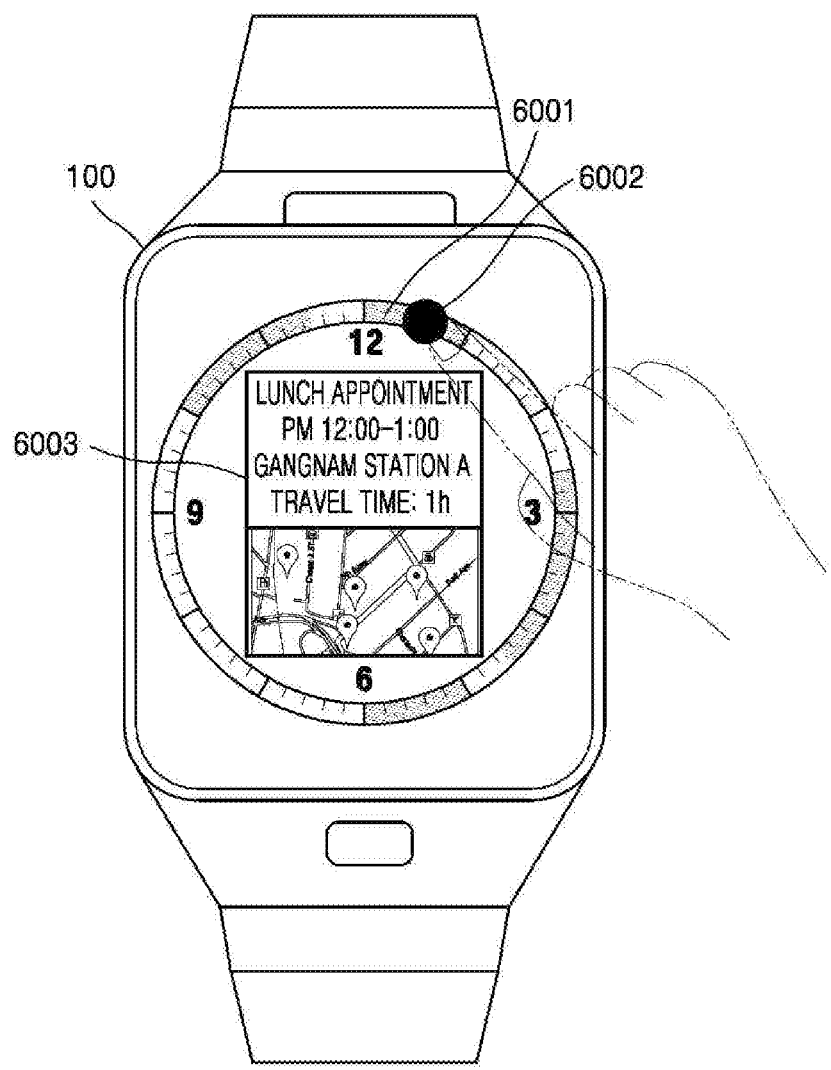

FIGS. 4, 5, and 6 illustrate a screen of the mobile terminal 100 which displays detailed schedule information, according to an embodiment.

When a schedule tag is selected by a user, the mobile terminal 100 may display detailed schedule information corresponding to the schedule tag. When the schedule tag is touched or clicked by the user, the mobile terminal 100 may display the detailed schedule information corresponding to the schedule tag.

The mobile terminal 100 may display the detailed schedule information by using an image, voice, vibration, or the like. A method of displaying, by the mobile terminal 100, the detailed schedule information is not limited thereto.

As illustrated in FIG. 4, the mobile terminal 100 may display a plurality of schedule tags on the screen. Referring to FIG. 4, a schedule tag 4001 may be selected by a touch input 4002 by the user. Alternatively, the schedule tag 4001 may be selected by an eye input, a voice input, an input using an external device, an input by selecting pre-input information, or the like. However, the present disclosure is not limited thereto.

When the schedule tag 4001 is selected, the mobile terminal 100 may display detailed schedule information 4003 corresponding to the schedule tag 4001. The mobile terminal 100 may display the detailed schedule information 4003 on a separate window. The mobile terminal 100 may display the detailed schedule information 4003 by using a text. The mobile terminal 100 may display the detailed schedule information 4003 to overlap the clock GUI.

The mobile terminal 100 may display the detailed schedule information 4003 by linking the detailed schedule information 4003 to the schedule tag 4001. For example, the mobile terminal 100 may display the detailed schedule information 4003 by displaying a line that links a window, on which the detailed schedule information 4003 is displayed, to the schedule tag 4001.

The mobile terminal 100 may display a schedule place, schedule time, contact information of the other party, a theme of a schedule, etc. on the detailed schedule information 4003 corresponding to the schedule tag 4001.

As illustrated in FIG. 5, the mobile terminal 100 may display a plurality of schedule tags on the screen. A schedule tag 5001 may be selected due to a touch input 5002 by the user. Alternatively, the schedule tag 5001 may be selected due to an eye input, a voice input, an input using an external device, an input by selecting pre-input information, or the like. However, the present disclosure is not limited thereto.

When the schedule tag 5001 is selected, the mobile terminal 100 may display detailed schedule information 5003 corresponding to the schedule tag 5001. The mobile terminal 100 may display the detailed schedule information 5003 by displaying a separate window or displaying a notification message.

The mobile terminal 100 may display the detailed schedule information 5003 by using an image. The mobile terminal 100 may display the detailed schedule information 5003 by using voice and an image. The mobile terminal 100 may display the detailed schedule information 5003 by simultaneously using an image and a text.

For example, the user may input, to the mobile terminal 100, schedule information of bathing a puppy during a time period of 10:00 a.m. to 11:40 a.m. The mobile terminal 100 may generate the schedule tag 5001 based on the input schedule information. The mobile terminal 100 may display the schedule tag 5001 on a part of the periphery of the clock GUI, the part being between 10:00 a.m. to 11:40 a.m. When the schedule tag 5001 is selected due to the touch input 5002 by the user, the mobile terminal 100 may display the detailed schedule information 5003. In this regard, the detailed schedule information 5003 may be displayed together with an image and voice of the puppy. The image and voice of the puppy may be input to the mobile terminal 100 by the user. By selecting the schedule tag 5001, the user may clearly recognize a schedule of bathing the puppy.

As illustrated in FIG. 6, the mobile terminal 100 may display a plurality of schedule tags on the screen. A schedule tag 6001 may be selected due to a touch input 6002 by the user. Alternatively, the schedule tag 6001 may be selected due to an eye input, a voice input, an input using an external device, an input by selecting pre-input information, or the like. However, the present disclosure is not limited thereto.

When the schedule tag 6001 is selected, the mobile terminal 100 may display detailed schedule information 6003 corresponding to the schedule tag 6001. The mobile terminal 100 may display the detailed schedule information 6003 by displaying a separate window or displaying a notification message.

The mobile terminal 100 may display the detailed schedule information 6003 together with a text and map. The mobile terminal 100 may display a location of an appointment, an appointment time, and travel time and a travel means to the location on the detailed schedule information 6003.

When schedule information corresponding to the schedule tag 6001 is moved from a current location of the user, the mobile terminal 100 may display movement notification information on the detailed schedule information 6003. The mobile terminal 100 may display the detailed schedule information 6003 including the current location of the user, a location of a destination, time information, a contact, or the like.

When the map displayed on the detailed schedule information 6003 is selected by the user, the mobile terminal 100 may display the magnified map. The mobile terminal 100 may display a travel path of the user on the map. The mobile terminal 100 may display the travel path of a shortest distance and minimum travel time.

Figure 7A:
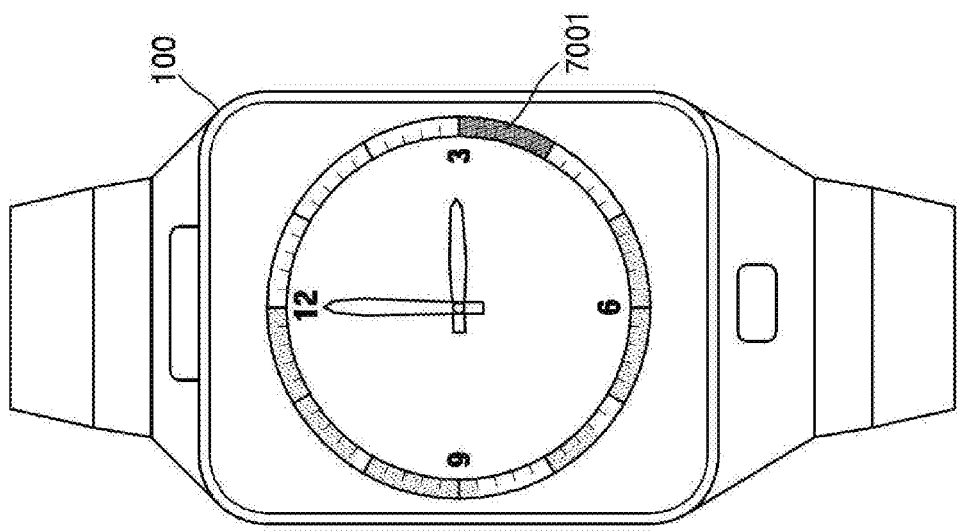
FIGS. 7A, 7B and 7C are diagrams illustrating the mobile terminal that changes and displays an attribute of a schedule tag according to each time corresponding to the schedule tag, according to an embodiment.
Figure 7B:
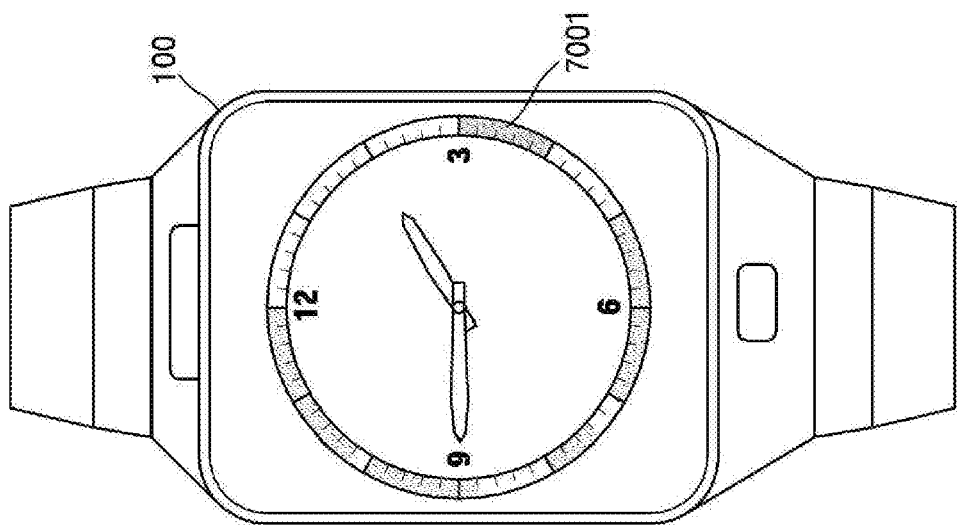
Figure 7C:
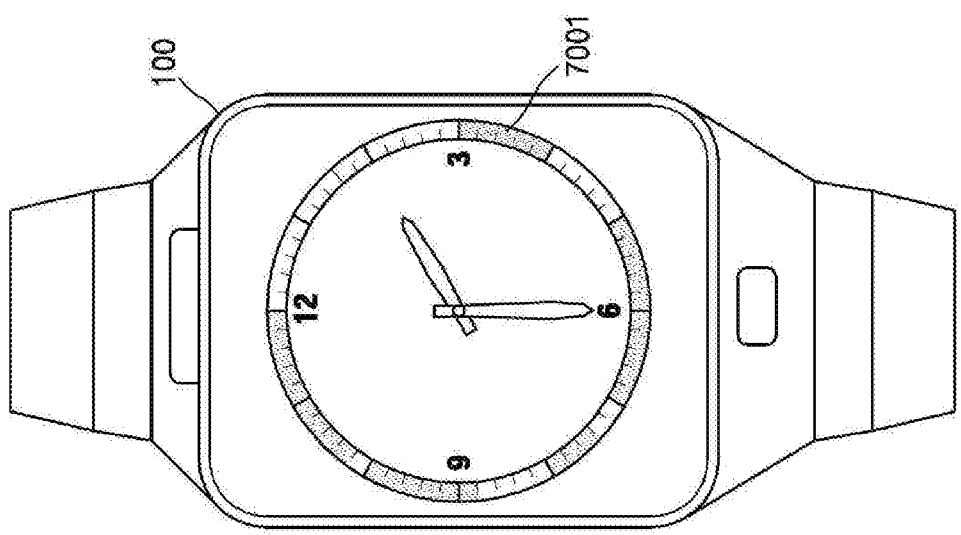
Figure 8A:
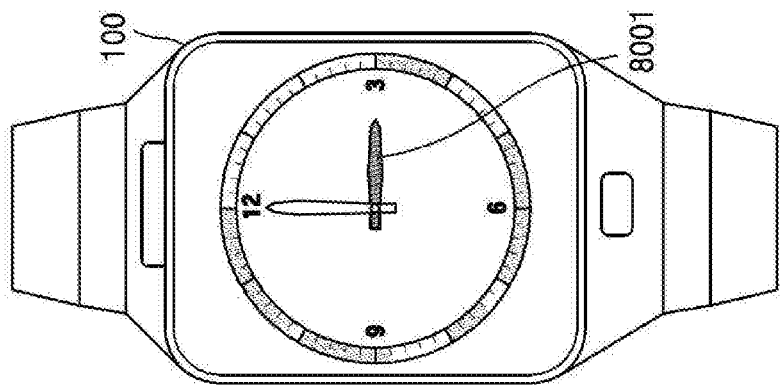
FIGS. 8A, 8B, 8C and 8D are diagrams illustrating the mobile terminal that changes and displays an attribute of an hour hand according to each time corresponding to a schedule tag, according to an embodiment.
Figure 8B:
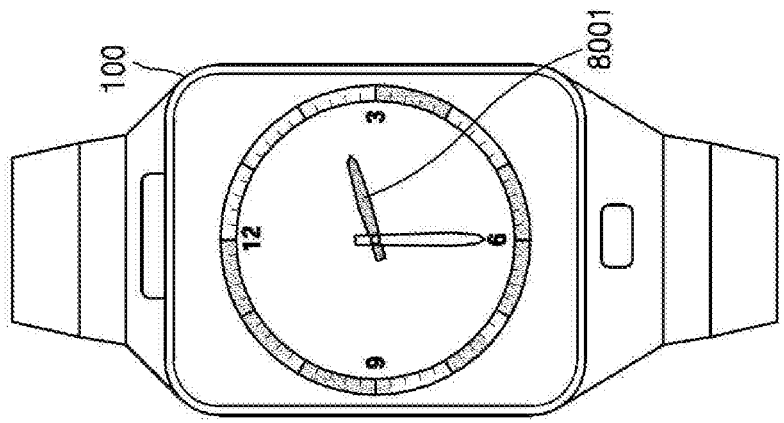
Figure 8C:
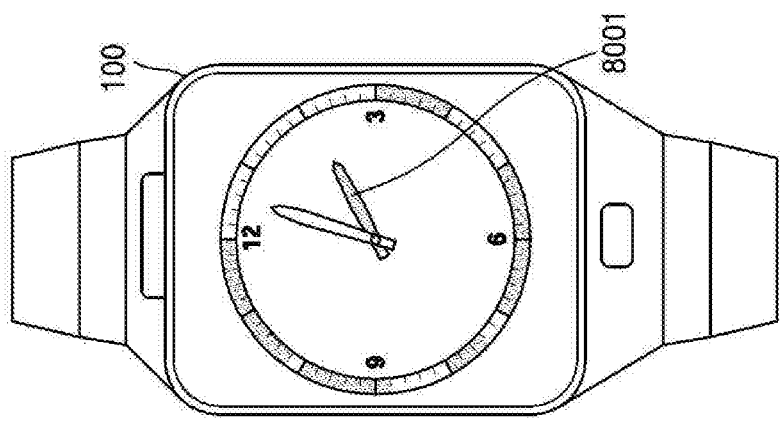
Figure 8D:
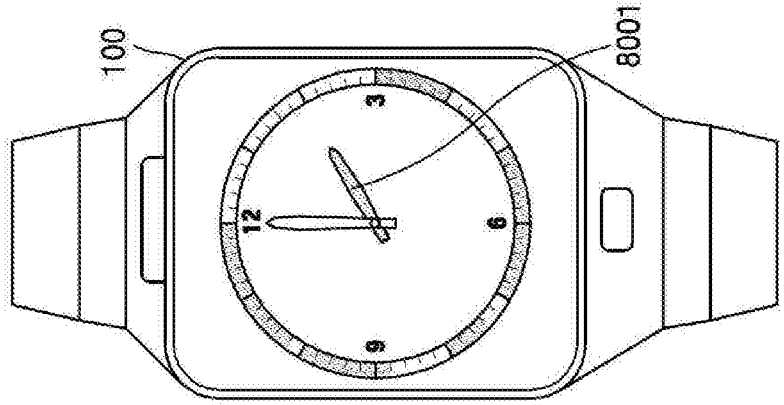

FIGS. 7A, 7B and 7C illustrate the mobile terminal 100 that changes and displays an attribute of a schedule tag according to each time corresponding to the schedule tag, according to an embodiment.

The mobile terminal 100 may display the schedule tag, based on current time and time corresponding to time corresponding to the schedule tag. The mobile terminal 100 may notify existence of a schedule to a user by changing and displaying the attribute of the schedule tag.

The mobile terminal 100 may change and display at least one of a shape, a size, a color, and brightness of the schedule tag, according to a type of a schedule corresponding to the schedule tag.

When the current time is included in a preset range of a time section corresponding to the displayed schedule tag, the mobile terminal 100 may change and display the attribute of the schedule tag. The time section corresponding to the schedule tag may indicate start time of the schedule that corresponds to the schedule tag. The preset range of the time section corresponding to the schedule tag may indicate a time period of the preset range to notify an approach of the start time of the schedule. For example, when a schedule notification is set to be active 1 hour before the schedule starts, the mobile terminal 100 may change and display the attribute of the schedule tag from 2:00 p.m. so as to notify the user of the schedule that starts at 3:00 p.m.

In addition, the changing and displaying of the attribute of the schedule tag may include sequentially changing the attribute of the schedule tag when current time approaches a start point of the time section corresponding to the displayed schedule tag. For example, when the start time of the schedule corresponding to the schedule tag approaches, a color of the schedule tag may be changed to notify a start of the schedule.

In more detail, as illustrated in FIGS. 7A, 7B and 7C, the mobile terminal 100 may change and display the attribute of the schedule tag, according to the current time and the time section corresponding to the schedule tag.

As illustrated in FIGS. 7A, 7B and 7C, when current time approaches three o'clock that is start time corresponding to a schedule tag 7001, the mobile terminal 100 may change brightness of the schedule tag 7001 and may display the schedule tag 7001.

When the current time approaches the start time of the schedule, the mobile terminal 100 may gradually increase the brightness of the displayed schedule tag 7001. In addition, when it is the start time of the schedule, the mobile terminal 100 may maximally increase the brightness of the displayed schedule tag 7001. Alternatively, the brightness of the displayed schedule tag 7001 may be returned to its original state. However, the present disclosure is not limited thereto.

In addition, even when the start time of the schedule elapsed, the mobile terminal 100 may notify the schedule to the user by changing the brightness of the displayed schedule tag 7001. Time when the brightness of the displayed schedule tag 7001 is changed may be set by the user or the mobile terminal 100.

FIGS. 8A, 8B, 8C and 8D illustrate the mobile terminal 100 that changes and displays an attribute of an hour hand according to each time corresponding to a schedule tag, according to an embodiment.

The mobile terminal 100 may change and display at least one of a color, a shape, and brightness of an hour hand, a minute hand, and a background image of the clock GUI, according to time information corresponding to the displayed schedule tag, and current time.

The mobile terminal 100 may effectively notify a schedule to a user by changing an attribute of the schedule tag and changing an attribute of an object of the clock GUI.

As illustrated in FIGS. 8A, 8B, 8C and 8D, when current time approaches three o'clock that is start time corresponding to a schedule tag, the mobile terminal 100 may change and display brightness of an attribute of an hour hand 8001. When the when current time approaches three o'clock, the mobile terminal 100 may change brightness of the hour hand 8001 and may display the hour hand 8001. The mobile terminal 100 may gradually increase or decrease the brightness of the displayed hour hand 8001. However, the present disclosure is not limited thereto.

The mobile terminal 100 may notify a schedule corresponding to the schedule tag 8001 by changing or adjusting a color, brightness, flicker, a level of opacity, a form, or a size of the hour hand or the minute hand.

The user may recognize the changed clock GUI, thereby easily checking existence of the schedule.

Figure 9:
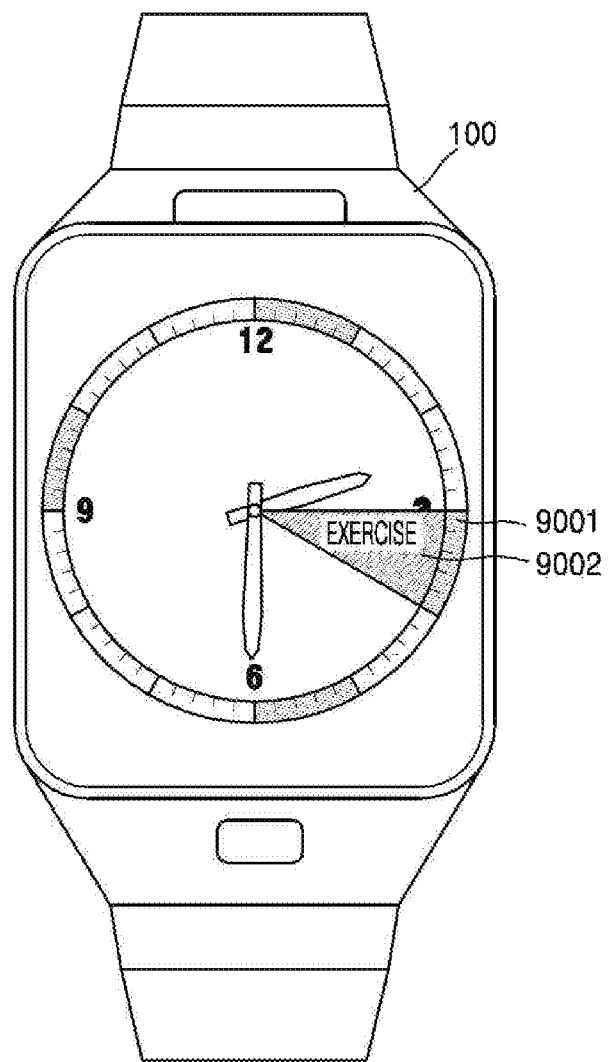
FIG. 9 is a diagram illustrating the mobile terminal that changes and displays an attribute of a background image of a clock graphical user interface (GUI) according to time corresponding to a schedule tag, according to an embodiment.

FIG. 9 illustrates the mobile terminal 100 that changes and displays an attribute of a background image of the clock GUI according to time corresponding to a schedule tag, according to an embodiment.

As illustrated in FIG. 9, when current time approaches start time corresponding to a schedule tag 9001, the mobile terminal 100 may change and display an attribute of a background image 9002 of the clock GUI.

In more detail, when the current time approaches 3 o'clock that is schedule start time, the mobile terminal 100 may change an attribute of the background image 9002, the attribute corresponding to a time period of the schedule tag 9001.

For example, the mobile terminal 100 may display a schedule on the background image 9002. The mobile terminal 100 may display the schedule by using a text, video, an image, an icon, or the like.

In addition, when the current time approaches 3 o'clock that is the schedule start time, the mobile terminal 100 may sequentially change and display the attribute of the background image 9002.

Figure 10:
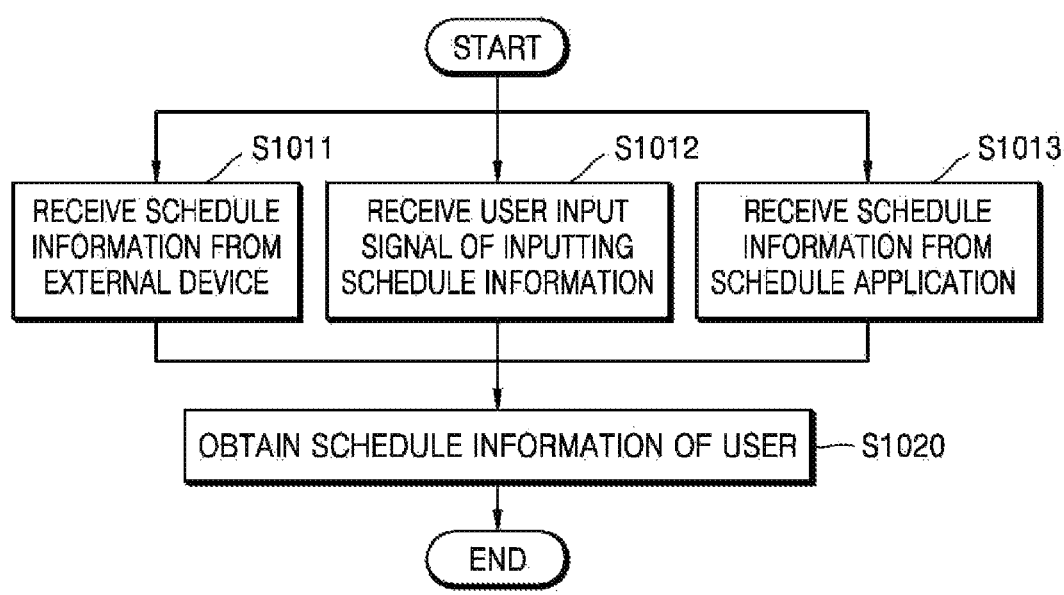
FIG. 10 illustrates a flowchart of a method of obtaining, by the mobile terminal, schedule information, according to an embodiment.

FIG. 10 illustrates a flowchart of a method of obtaining, by the mobile terminal 100, schedule information, according to an embodiment.

The mobile terminal 100 may obtain the schedule information so as to generate a schedule tag.

The mobile terminal 100 may include at least one of receiving the schedule information from an external device (operation S1011), receiving an input of the schedule information from a user (operation S1012), and receiving an input of the schedule information from a schedule application (operation S1013).

The schedule information may include schedule target information, schedule location information, time information, or the like. A type of the schedule information is not limited, and may include an image, voice, a motion, a text, a photo, or the like. The schedule place information may include a current location of a user, and a destination location. In this regard, when the schedule information is received, the current location of the user may be automatically set in a manner that the mobile terminal 100 recognizes a location of the user. In addition, when the location of the user is changed at a later time, the current location of the user may also be changed. The time information may include schedule start time and schedule end time.

In operation S1020, the mobile terminal 100 may obtain the schedule information of the user. The mobile terminal 100 may generate the schedule tag based on the obtained schedule information, and then may display the schedule tag on the screen.

Figure 11:
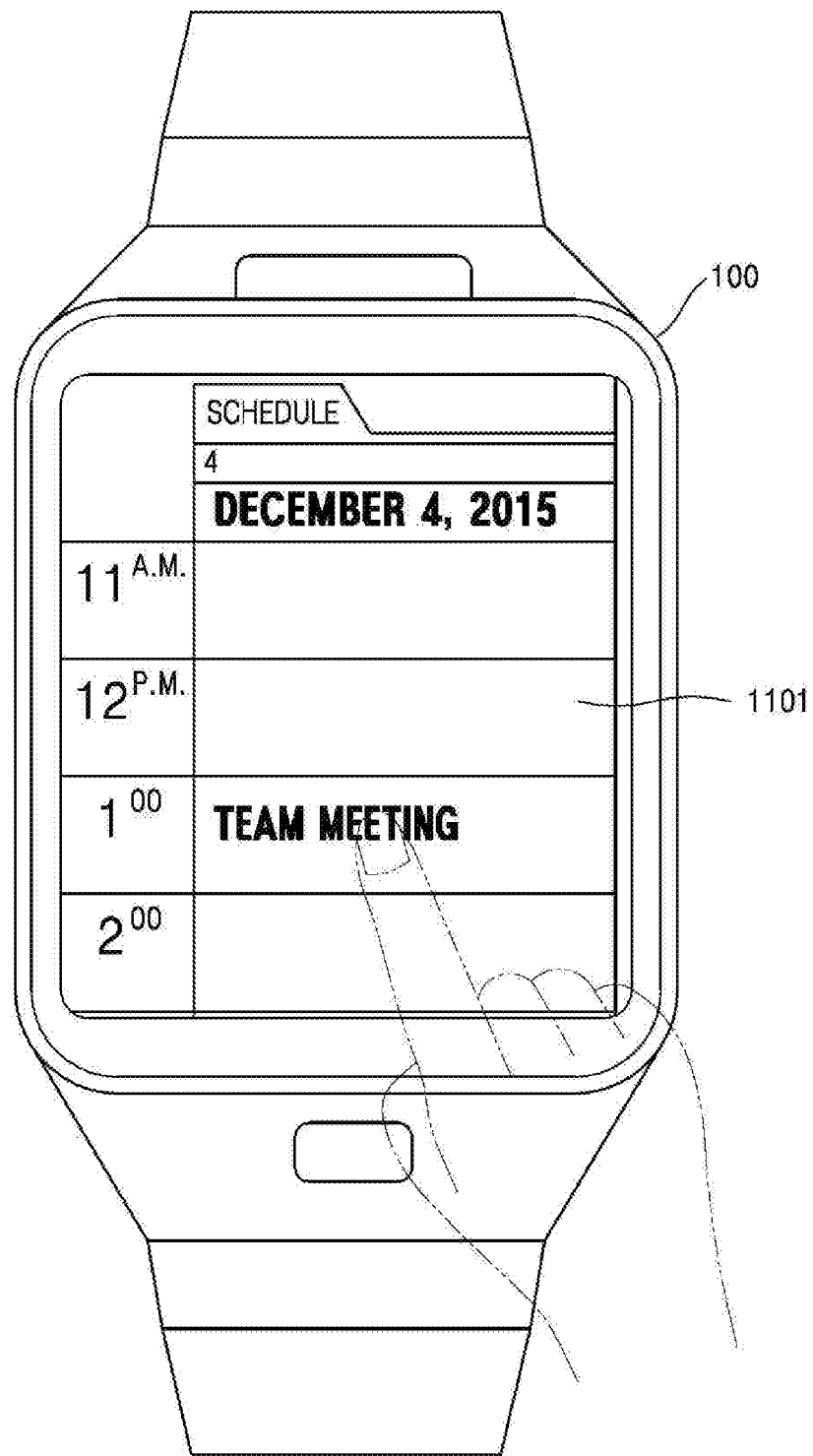
FIG. 11 is a diagram illustrating the mobile terminal that directly receives an input of a schedule from a user, according to an embodiment.

FIG. 11 illustrates the mobile terminal 100 that directly receives an input of a schedule from a user, according to an embodiment.

As illustrated in FIG. 11, the mobile terminal 100 may obtain schedule information from the user. The mobile terminal 100 may receive the schedule information via a touch input by the user. Alternatively, the mobile terminal 100 may receive the schedule information via a user input with a touch pen, a user input with a button, a voice input, or a gesture input. However, the present disclosure is not limited thereto.

In addition, the mobile terminal 100 may receive an input of the schedule information from the user by using an application included in the mobile terminal 100. The application may include any application for inputting schedule information.

Figure 12:
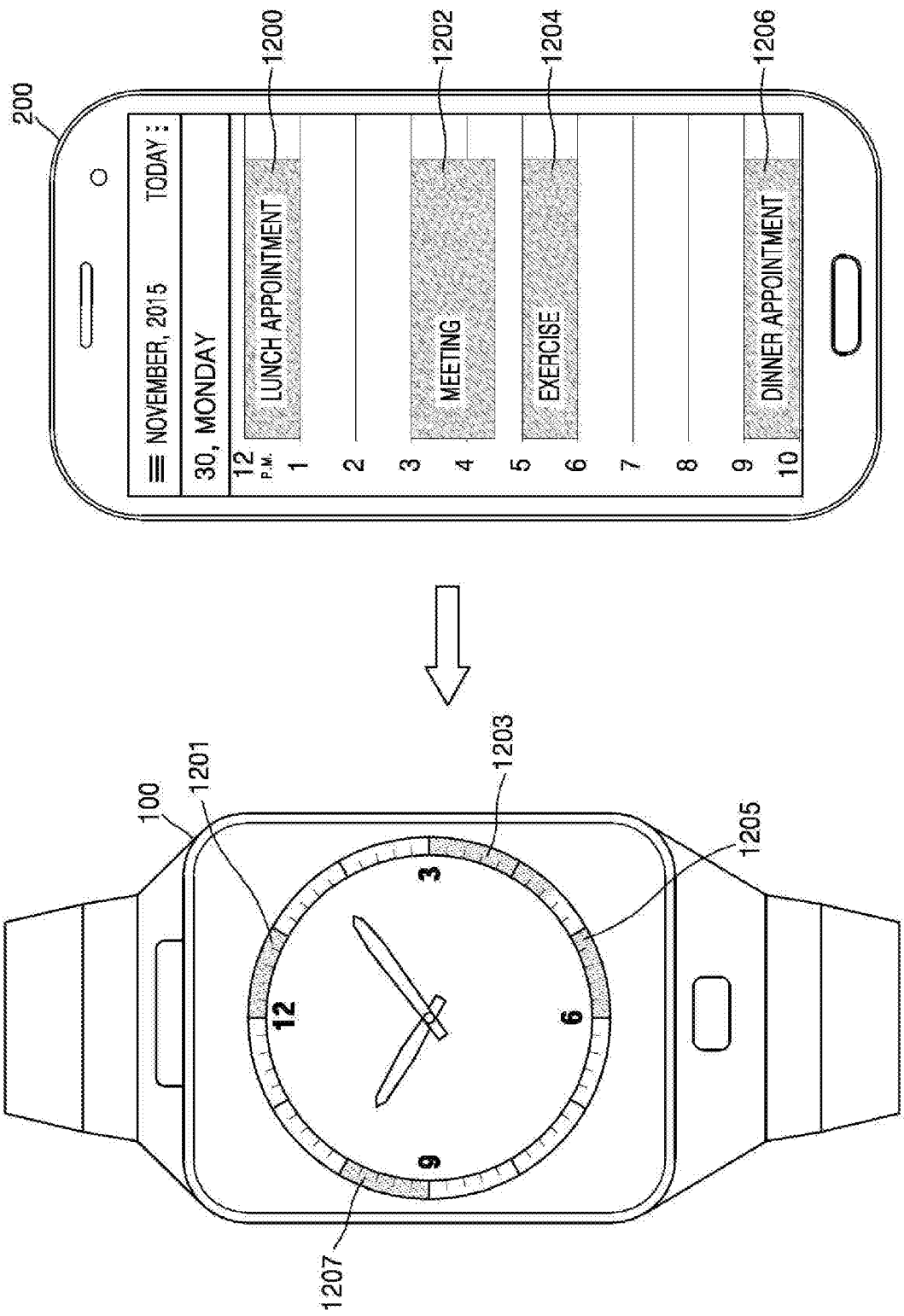
FIG. 12 is a diagram illustrating the mobile terminal that obtains a schedule from an external device, according to an embodiment.

FIG. 12 illustrates the mobile terminal 100 that obtains a schedule from an external device, according to an embodiment.

The external device according to the present embodiment may include a mobile phone, a smartphone, a notebook computer, a terminal for digital broadcasting, a PDA, a PMP, a camera, navigation, a tablet computer, an e-book terminal, a smart watch, or the like. In the present embodiment, the external device may be a server.

According to the present embodiment, the mobile terminal 100 may continuously communicate with an external device 200 so as to obtain schedule information of a user. For example, in order to obtain the schedule information of the user, the mobile terminal 100 may obtain the schedule information at regular intervals from a schedule application of the external device 200.

In more detail, as illustrated in FIG. 12, the external device 200 may transmit the schedule information to the mobile terminal 100 via the schedule application. For example, the external device 200 may transmit a lunch appointment schedule 1200, a meeting schedule 1202, an exercise schedule 1204, and a dinner appointment schedule 1206 to the mobile terminal 100.

The mobile terminal 100 may generate schedule tags based on a plurality of pieces of received schedule information 1200, 1202, 1204, and 1206. For example, a schedule tag 1201 may be generated to correspond to the lunch appointment schedule 1200, a schedule tag 1203 may be generated to correspond to the meeting schedule 1202, a schedule tag 1205 may be generated to correspond to the exercise schedule 1204, and a schedule tag 1207 may be generated to correspond to the dinner appointment schedule 1206.

The mobile terminal 100 may display the schedule tags on the periphery of the displayed clock GUI, based on a plurality of pieces of time information corresponding to the schedule tags.

Figure 13:
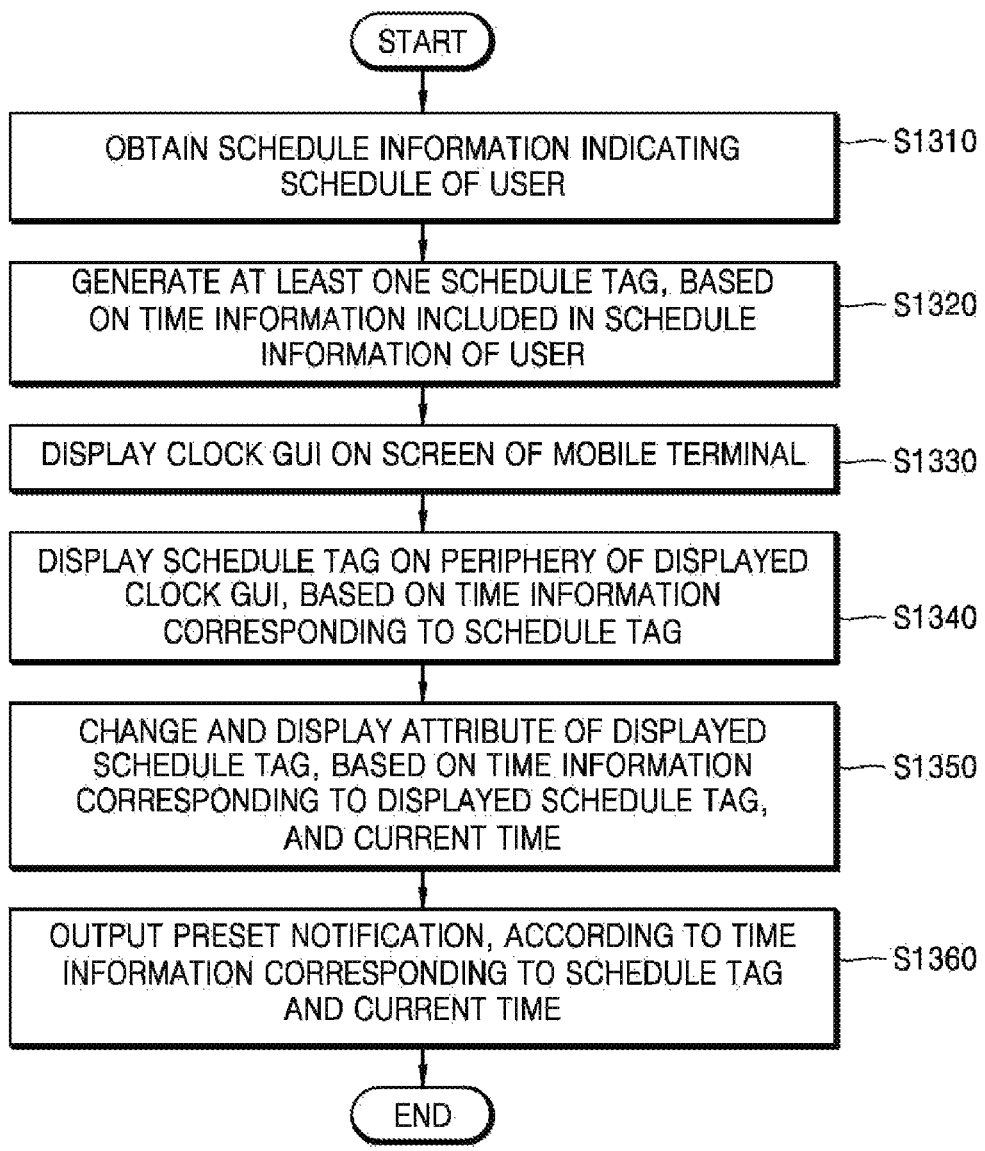
FIG. 13 illustrates a flowchart of a method of outputting, by the mobile terminal, a notification according to time corresponding to a schedule tag, according to an embodiment.

FIG. 13 illustrates a flowchart of a method of outputting, by the mobile terminal 100, a notification according to time corresponding to a schedule tag, according to an embodiment.

In operation S1310, the mobile terminal 100 may obtain schedule information indicating a schedule of a user.

In operation S1320, the mobile terminal 100 may generate at least one schedule tag, based on time information included in the schedule information of the user.

In operation S1330, the mobile terminal 100 may display the clock GUI on the screen of the mobile terminal 100.

In operation S1340, the mobile terminal 100 may display the schedule tag on the periphery of the displayed clock GUI, based on the time information corresponding to the schedule tag.

In operation S1350, the mobile terminal 100 may change and display an attribute of the schedule tag, based on the time information corresponding to the displayed schedule tag, and current time. When the current time approaches the time information corresponding to the schedule tag or when the current time overlaps the time information corresponding to the schedule tag, the mobile terminal 100 may change and display the attribute of the schedule tag.

In operation S1360, the mobile terminal 100 may output a preset notification, according to the time information corresponding to the schedule tag and the current time.

In this regard, the notification may include at least one of a visual notification, an acoustic notification, and a tactile notification.

The mobile terminal 100 may provide a schedule notification with a change in the schedule tag. The mobile terminal 100 may clearly notify existence of a schedule to the user via the additional schedule notification.

The mobile terminal 100 may output a notification so as to notify the schedule before the schedule starts. When the current time approaches start time corresponding to the schedule tag, the mobile terminal 100 may output a preset notification. For example, when the start time corresponding to the schedule tag is 3:00 p.m., the mobile terminal 100 may output the preset notification from 2:00 p.m.

The mobile terminal 100 may previously determine time for outputting the notification to notify a start of the schedule. The time for outputting the notification may be set by the user.

The mobile terminal 100 may output the notification to notify the start of the schedule. When the current time corresponds to the start time that corresponds to the schedule tag, the mobile terminal 100 may output the preset notification.

The mobile terminal 100 may previously determine time of outputting a notification to notify the schedule before the schedule starts. The time of outputting the notification may be set by the user. The time of outputting the notification may be set based on a type of the schedule, a current state of the user, and a state of an environment. A scheme of outputting the notification may be set based on a type of the schedule, a current state of the user, and a state of an environment. However, the present disclosure is not limited thereto.

Figure 14:
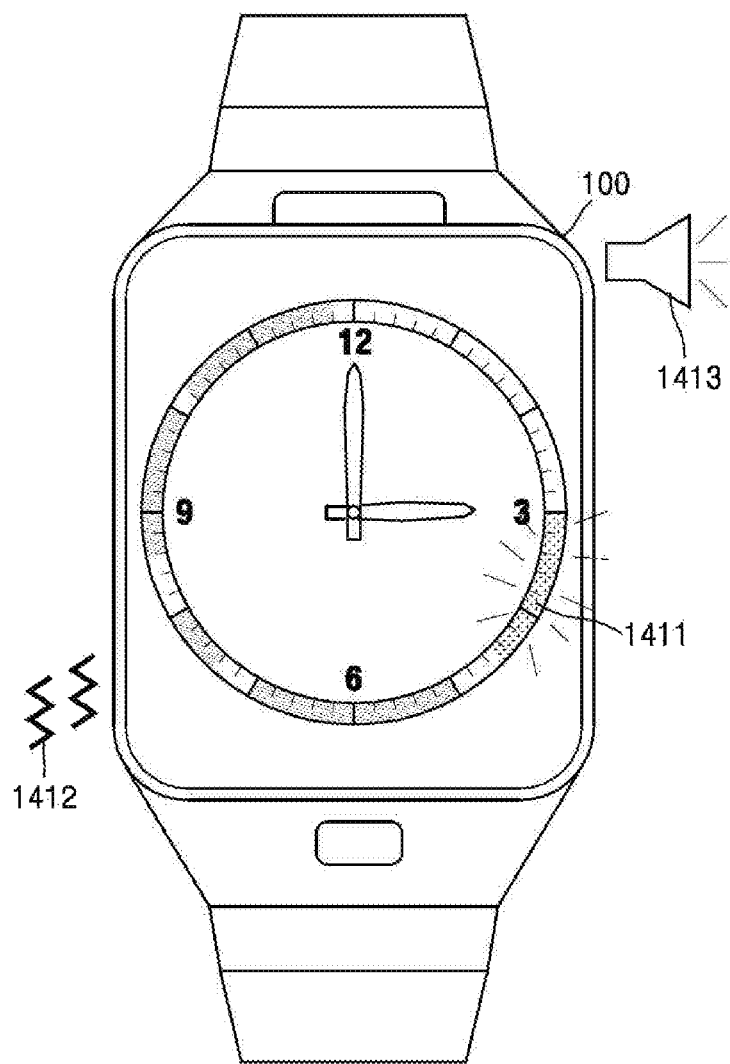
FIG. 14 is a diagram illustrating an example in which a notification is output from the mobile terminal according to time corresponding to a schedule tag, according to an embodiment.

FIG. 14 illustrates an example in which a notification is output from the mobile terminal 100 according to time corresponding to a schedule tag, according to an embodiment.

The mobile terminal 100 may output a preset notification according to time information corresponding to the schedule tag, and current time. When schedule time corresponding to the schedule tag approaches or when it is the schedule time, the mobile terminal 100 may output the preset notification.

The mobile terminal 100 may output a visual notification 1411 by using a display unit. The mobile terminal 100 may change an attribute of the schedule tag and may output the visual notification 1411 about the schedule. For example, the visual notification 1411 may be set so that brightness of the schedule tag, an hour hand, and a minute hand flickers thirty minutes before schedule start time.

The mobile terminal 100 may notify the schedule by displaying a new window or a message. The mobile terminal 100 may notify the schedule by changing an attribute of an element of the clock GUI. The mobile terminal 100 may notify the schedule by adjusting brightness, a color, or a level of opacity of the display unit.

The mobile terminal 100 may output an acoustic notification 1413. The mobile terminal 100 may output the acoustic notification 1413 before the schedule starts. The mobile terminal 100 may output the acoustic notification 1413 indicating an elapse of the schedule start time. The mobile terminal 100 may output schedule information corresponding to the schedule tag by using the acoustic notification 1413 using voice. In this regard, the voice may include a preset voice recording or a voice recording directly recorded by the user. The acoustic notification 1413 may be set based on a type of the schedule, a current state of the user, and a state of an environment. However, the present disclosure is not limited thereto.

The mobile terminal 100 may output a tactile notification 1412. The tactile notification 1412 may indicate vibration of the mobile terminal 100. The mobile terminal 100 may output the tactile notification 1412 before the schedule starts. The mobile terminal 100 may output the tactile notification 1412 indicating an elapse of the schedule start time. The mobile terminal 100 may output schedule information corresponding to the schedule tag by using the tactile notification 1412 using voice. In this regard, the voice may include a preset voice recording or a voice recording directly recorded by the user. The tactile notification 1412 may be set based on a type of the schedule, a current state of the user, and a state of an environment. However, the present disclosure is not limited thereto.

Figure 15:
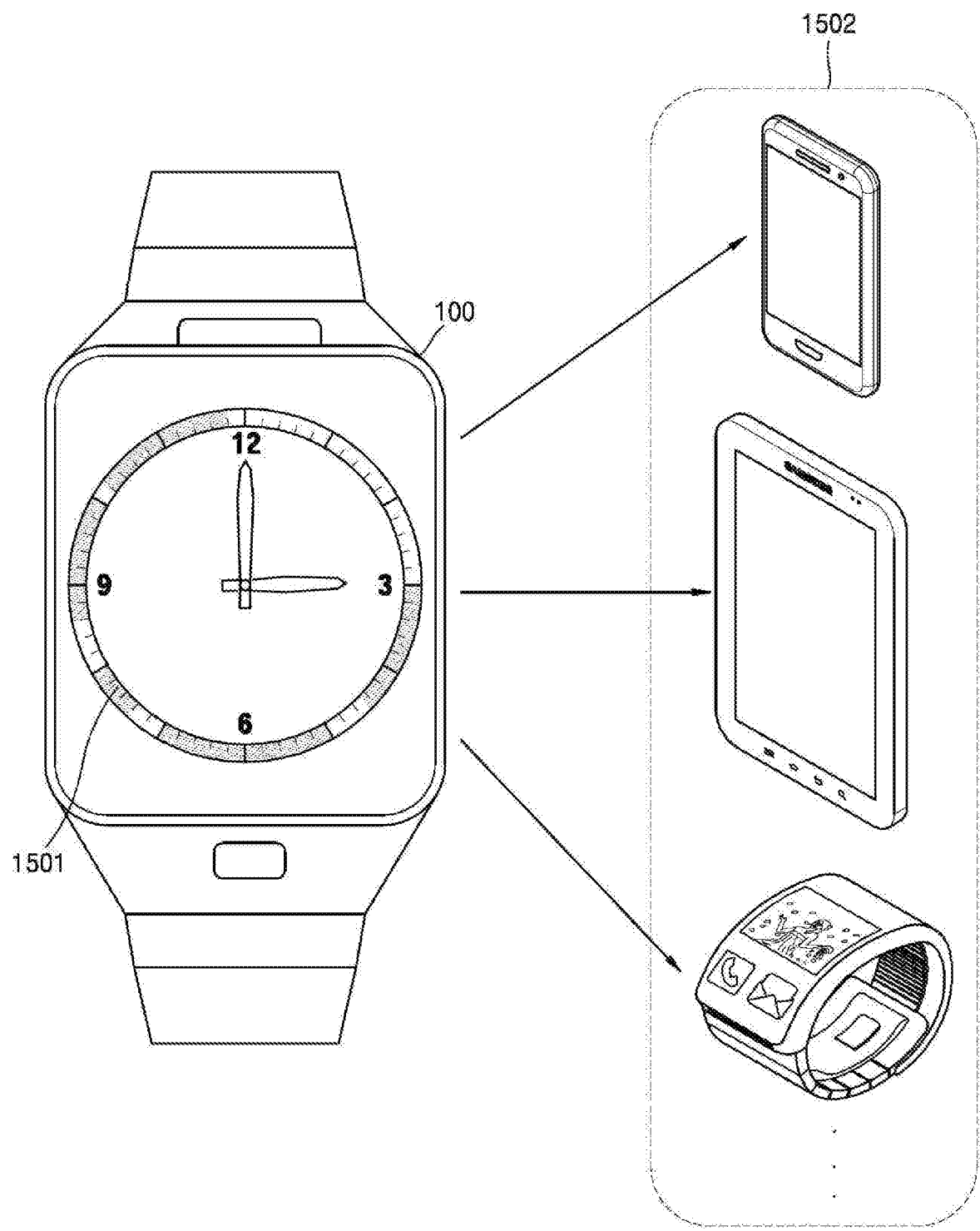
FIG. 15 is a diagram illustrating the mobile terminal that notifies schedule information to an external device according to time corresponding to a schedule tag, according to an embodiment.

FIG. 15 illustrates the mobile terminal 100 that notifies schedule information to an external device according to time corresponding to a schedule tag, according to an embodiment.

The mobile terminal 100 may transmit the schedule information corresponding to the schedule tag to an external device 1502 having preset authority, according to time information corresponding to the displayed schedule tag, and current time.

The external device 1502 having preset authority may refer to a device capable of checking a schedule. The external device 1502 having preset authority may be preset by a user. In this regard, the external device 150 may include a mobile phone, a smartphone, a notebook computer, a terminal for digital broadcasting, a PDA, a PMP, a camera, navigation, a tablet computer, an e-book terminal, a smart watch, or the like. However, the present disclosure is not limited thereto.

The external device 1502 having preset authority may be plural in number. The mobile terminal 100 may simultaneously transmit schedule notification information to the plurality of external devices 1502. The mobile terminal 100 may transmit only schedule information corresponding to a preset schedule tag 1501 to the external device 1502.

The external device 1502 may be authorized by the mobile terminal 100. Alternatively, the mobile terminal 100 may assign authority to the external device 1502 when the mobile terminal 100 transmits the schedule information.

Figure 16:
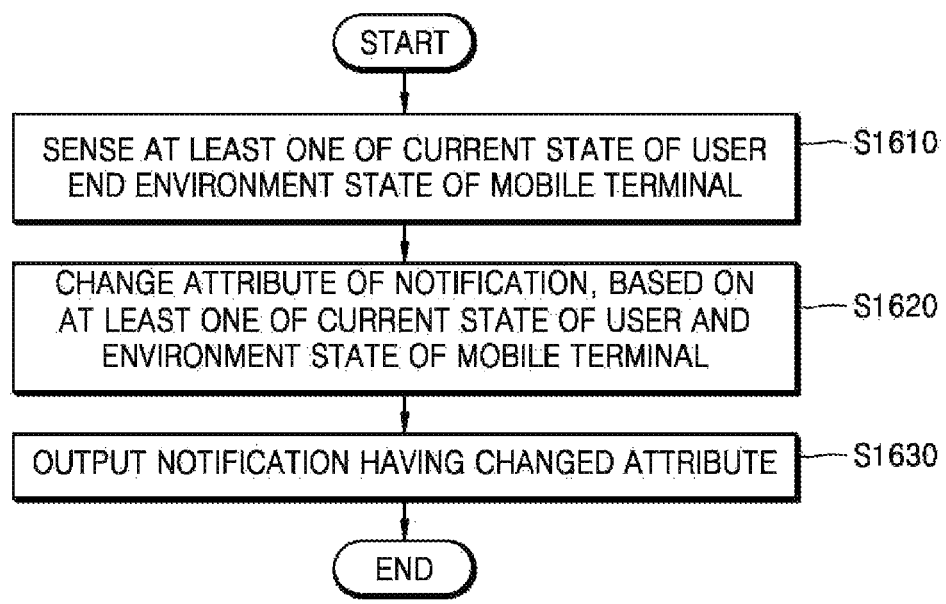
FIG. 16 is a diagram for describing an example in which the mobile terminal changes an attribute of a notification according to a current state of a user and an environment of the mobile terminal, and outputs the notification, according to an embodiment.

FIG. 16 is a diagram for describing an example in which the mobile terminal 100 changes an attribute of a notification according to a current state of a user and an environment of the mobile terminal 100, and outputs the notification, according to an embodiment.

The mobile terminal 100 may output a notification based on a situation by changing an attribute of the notification according to a current state of the user and an environment of the mobile terminal 100. The mobile terminal 100 may automatically change the attribute of the notification according to the current state of the user and the environment of the mobile terminal 100.

In operation S1610, the mobile terminal 100 may sense at least one of the current state of the user and an environment state of the mobile terminal 100.

The current state of the user may refer to a biological state of the user which includes a pulse, a breathing rate, blood pressure, etc. of the user. For example, the mobile terminal 100 may sense the current state of the user by measuring a heart rate of the user.

The environment state of the mobile terminal 100 may indicate external factors including an ambient noise state, an ambient light state, etc. For example, the mobile terminal 100 may sense the environment state by sensing ambient noise.

In operation S1620, the mobile terminal 100 may change the attribute of the notification, based on at least one of the current state of the user and the environment state of the mobile terminal 100.

The mobile terminal 100 may change a preset attribute of the notification, based on at least one of the sensed current state of the user and the environment state of the mobile terminal 100.

In operation S1630, the mobile terminal 100 may output the notification having the changed attribute.

For example, the mobile terminal 100 may analyze the heart rate of the user, thereby determining that the current state of the user is a sleep state. In order not to disturb the sleep state of the user, the mobile terminal 100 may change the attribute of the notification. The mobile terminal 100 may change the notification to be an acoustic notification with a lowered volume or may stop the acoustic notification. The mobile terminal 100 may change the notification to be a vibration notification with a decreased strength or may stop the vibration notification. The mobile terminal 100 may change time of outputting the notification, based on the current state of the user.

In the embodiment, the mobile terminal 100 senses the current state of the user by measuring the heart rate of the user, but the present disclosure is not limited thereto. The mobile terminal 100 may include various sensors for sensing the current state including biological information of the user.

In addition, the mobile terminal 100 may change the attribute of the notification, based on the environment state. As a result of analyzing ambient noise sensed by the mobile terminal 100, the mobile terminal 100 may determine that the environment state is a noisy environment. Then, the mobile terminal 100 may change the attribute of the notification according to the noisy environment.

For example, the mobile terminal 100 may change the notification to be an acoustic notification with a raised volume or may increase a frequency of the acoustic notification. The mobile terminal 100 may change the notification to be a vibration notification with an increased strength or may increase a frequency of the vibration notification. The mobile terminal 100 may change time of outputting the notification, based on the environment of the mobile terminal 100.

Figure 17:
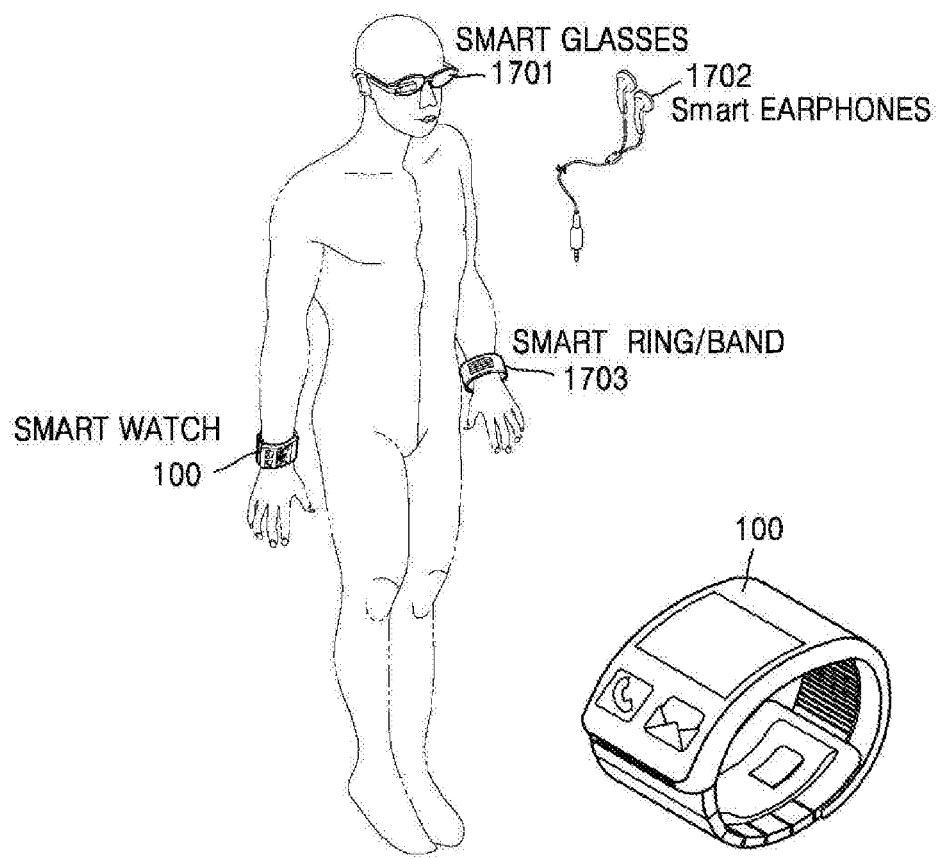
FIG. 17 is a diagram illustrating types of the mobile terminal that senses a current state of a user, according to an embodiment.

FIG. 17 illustrates types of the mobile terminal 100 that senses a current state of a user, according to an embodiment.

According to the present embodiment, the user may have a plurality of mobile terminals 100. According to the present embodiment, the user may additionally have wearable devices 1701, 1702, and 1703 capable of measuring biological information of the user. The mobile terminal 100 may be one of types of a wearable device. The wearable devices 1701, 1702, and 1703 may be registered in the mobile terminal 100.

The mobile terminal 100 may directly measure the biological information of the user. In addition, the mobile terminal 100 may obtain information about a current state of the user from the wearable devices 1701, 1702, and 1703.

The mobile terminal 100 may change an attribute of a notification, based on the current state of the user, and may output the notification with the changed attribute.

Figure 18:
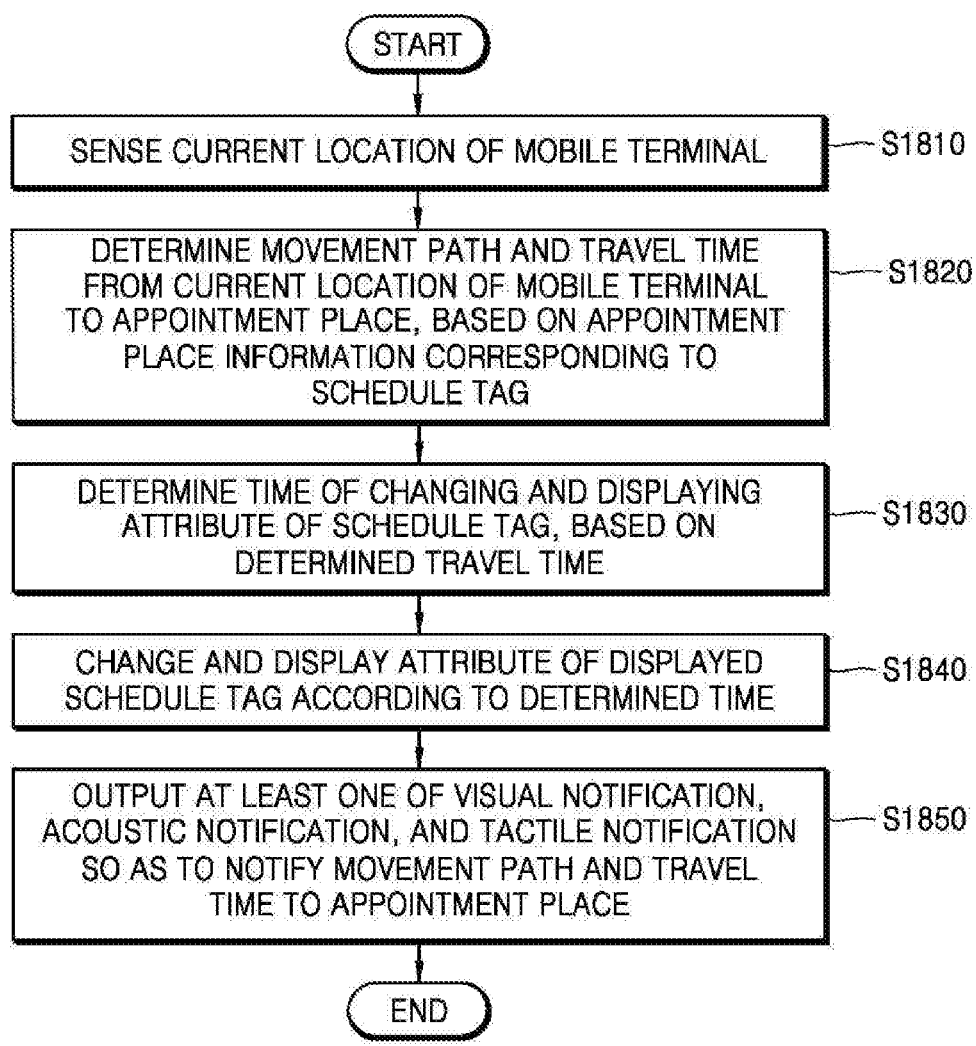
FIG. 18 illustrates a flowchart for describing that a notification is output based on a movement path and travel time, according to an embodiment.

FIG. 18 illustrates a flowchart for describing that a notification is output based on a movement path and travel time, according to an embodiment.

In operation S1810, the mobile terminal 100 may sense a current location of the mobile terminal 100. The mobile terminal 100 may sense the current location of the mobile terminal 100, thereby determining the current location to be a start point. The mobile terminal 100 may determine a distance from the start point to a schedule place included in schedule information.

In operation S1820, the mobile terminal 100 may determine a movement path and travel time from the current location of the mobile terminal 100 to an appointment location, based on appointment place information corresponding to a schedule tag.

The mobile terminal 100 may determine the movement path and travel time to the appointment location by using a navigation application. The mobile terminal 100 may determine the movement path and travel time to the appointment location, based on the start point. The mobile terminal 100 may determine the movement path and travel time, based on pre-determined transportation means. The pre-determined transportation means may be set by a user. The mobile terminal 100 may determine a shortest distance and shortest time according to transportation means. The mobile terminal 100 may determine in real-time the movement path and travel time according to a change in the current location of the mobile terminal 100.

In operation S1830, the mobile terminal 100 may determine time of changing and displaying an attribute of a schedule tag, based on the determined travel time.

The mobile terminal 100 may determine time of displaying the schedule tag, based on the transportation means, the movement path, and the travel time. For example, when the travel time is determined, the time of displaying the schedule tag may be changed in consideration of start time corresponding to the schedule tag, and the travel time. In more detail, when a schedule requires travel time of thirty minutes, the schedule tag may be displayed thirty minutes before schedule start time. The user may effectively recognize a schedule notification to which the travel time is reflected.

In operation S1840, the mobile terminal 100 may change and display the attribute of the displayed schedule tag. The attribute of the schedule tag may be changed according to the schedule information corresponding to the schedule tag, and may be displayed. The mobile terminal 100 may change and display the attribute of the schedule tag by taking into account a current location of the user and a distance to a final destination place. The mobile terminal 100 may change and display the attribute of the schedule tag in real-time.

In operation S1850, the mobile terminal 100 may output at least one of a visual notification, an acoustic notification, and a tactile notification so as to notify the movement path and travel time to the appointment place.

The mobile terminal 100 may output an additional notification so as to effectively notify the schedule of the user. The mobile terminal 100 may change and display the attribute of the schedule tag and may simultaneously output the additional notification. The mobile terminal 100 may separately display a recommended path to the appointment place, the transportation means, and the travel time. In addition, the mobile terminal 100 may notify the schedule via voice and a vibration notification.

The mobile terminal 100 may output the notification according to a pre-determined time interval. The pre-determined time interval may refer to initial time of outputting the notification with respect to the schedule start time. The pre-determined time interval may be determined according to minimum travel time from the current location to the appointment place. The minimum travel time may vary according to the current location of the user, a location of the appointment place, and transportation means selected by the user. When the location of the user is changed, the minimum travel time may be changed. The mobile terminal 100 may change an interval for the notification, based on the changed minimum travel time.

In addition, the mobile terminal 100 may change a notification mode, based on the pre-determined time interval and the minimum travel time. For example, when the pre-determined time interval is equal to the minimum travel time, the mobile terminal 100 may change the notification mode from a normal notification mode to an urgent notification mode. The urgent notification mode and the normal notification mode may differ in notification attribute. For example, the urgent notification mode may be different from the normal notification mode in notification time, strength of a vibration, and volume level. The mobile terminal 100 may display the urgent notification mode via the display unit.

Figure 19:
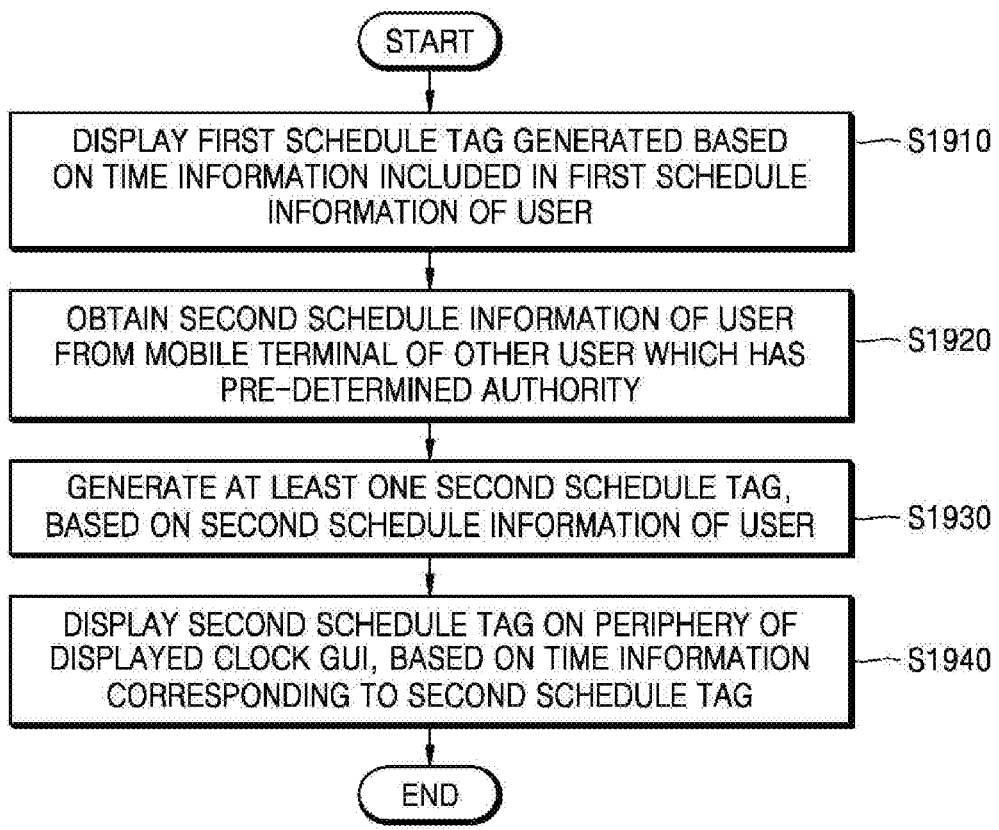
FIG. 19 illustrates a flowchart with respect to the mobile terminal that obtains schedule information from a mobile terminal of another user and generates a schedule tag, according to an embodiment.

FIG. 19 illustrates a flowchart with respect to the mobile terminal 100 that obtains schedule information from a mobile terminal of another user and generates a schedule tag, according to an embodiment.

Referring to the flowchart of FIG. 19, the mobile terminal 100 may display a plurality of pieces of schedule information from different senders. The mobile terminal 100 may obtain, from a plurality of mobile terminals 100, and notify a plurality of pieces of user schedule information. The mobile terminal 100 may receive user schedule information from a mobile terminal of another user, and may display the user schedule information with an existing schedule. The mobile terminal of the other user may obtain authority on a pre-determined schedule from the user.

Hereinafter, first schedule information may refer to schedule information that is set according to authority of the user, and second schedule information may refer to schedule information that is set by the other user. The second schedule information may be obtained from a terminal of the other user which obtained authority of the user. The second schedule information may be user schedule information obtained from the terminal of the other user.

In operation S1910, the mobile terminal 100 may display a first schedule tag generated based on time information included in the first schedule information of the user. The first schedule tag may be generated based on the first schedule information that was directly obtained from the user. The first schedule information may be obtained by receiving a direct input from the user, may be received from a server related to the user, or may be obtained from another mobile terminal 100 of the user.

In operation S1920, the mobile terminal 100 may obtain the second schedule information of the user from the mobile terminal of the other user which has pre-determined authority.

The mobile terminal of the other user and the mobile terminal 100 of the user may communicate in real-time so as to exchange schedule information. Before the mobile terminal 100 receives schedule information from the mobile terminal of the other user, the mobile terminal 100 may select whether or not to receive the schedule information.

The second schedule information may include at least one of sender information, an appointment place, appointment time, contact information, and detailed schedule information. The second schedule information may be about a schedule of the user of the mobile terminal 100. The second schedule information may indicate schedule information of the user which is set by the other user. However, the present disclosure is not limited thereto, and the second schedule information may indicate schedule information of the other user.

The mobile terminal of the other user may include a mobile phone, a smartphone, a notebook computer, a terminal for digital broadcasting, a PDA, a PMP, a camera, navigation, a tablet computer, an e-book terminal, a smart watch, or the like. However, the present disclosure is not limited thereto.

In S1930, the mobile terminal 100 may generate at least one second schedule tag, based on time information included in the second schedule information of the user. A plurality of second schedule tags may be generated based on the second schedule information.

A generated shape of the second schedule tag may vary according to time of the schedule information. When the schedule information corresponds to a preset event, the second schedule tag may be generated with a pre-determined shape. The second schedule tag may have an attribute that is different from that of the first schedule tag. For example, the attribute may be at least one of a shape, a color, a form, brightness, a level of opacity, and a size.

In operation S1940, the mobile terminal 100 may display the second schedule tag on the periphery of the displayed clock GUI, based on the time information corresponding to the second schedule tag.

The second schedule tag and the first schedule tag may be displayed to be distinguished therebetween. The second schedule tag and the first schedule tag may be displayed at different locations. For example, the second schedule tag may be displayed between the first schedule tag and the periphery of the clock GUI. However, the present disclosure is not limited thereto.

According to the first schedule information and the second schedule information displayed on the mobile terminal 100, the user may simultaneously check the schedule set by the user, and the schedule of the user which was set by the other user.

Alternatively, the user may manage schedule information of the other user together with a schedule of the user. For example, when the second schedule tag is displayed based on schedule information of a child of the user, the user may check the schedule of the user and a notification regarding a schedule of the child. In addition, due to notifications that are output according to schedule tags, it is possible to accurately manage schedules.

Figure 20:
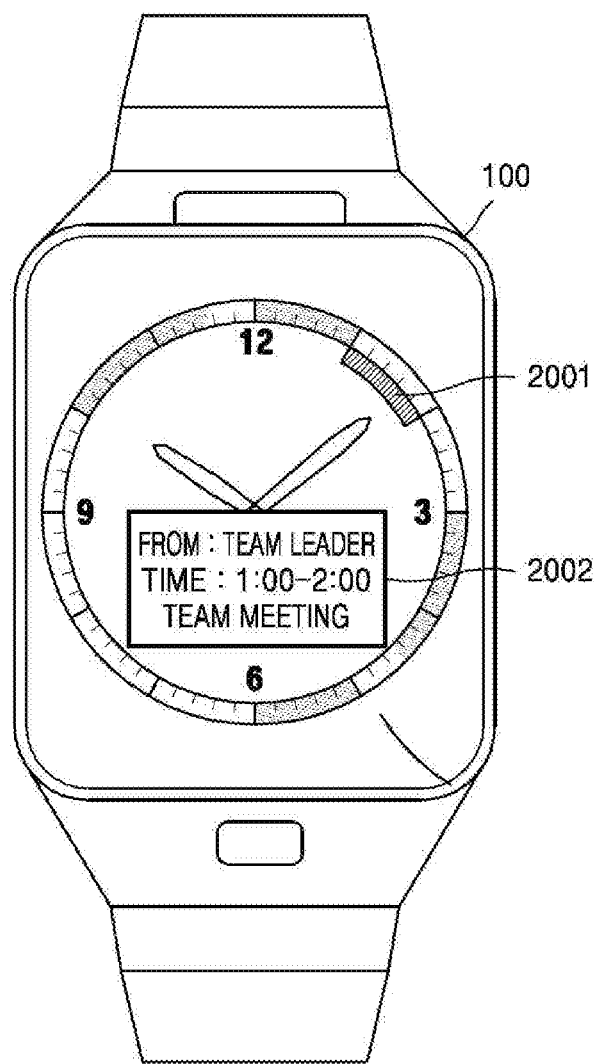
FIG. 20 is a diagram illustrating a screen of the mobile terminal that displays detailed schedule information obtained from a mobile terminal of another user, according to an embodiment.

FIG. 20 illustrates a screen of the mobile terminal 100 that displays detailed schedule information obtained from a mobile terminal of another user, according to an embodiment.

As illustrated in FIG. 20, the mobile terminal 100 may display a second schedule tag 2001. The second schedule tag 2001 may be generated based on schedule information obtained from the mobile terminal of the other user. The second schedule tag 2001 may be displayed to be distinguished from a first schedule tag displayed on the periphery of the clock GUI. For example, the second schedule tag 2001 and the first schedule tag may be different from each other in a display location or a tag shape. However, the present disclosure is not limited thereto.

When a user selects the second schedule tag 2001, the mobile terminal 100 may display detailed schedule information corresponding to the second schedule tag 2001. The second schedule tag 2001 may be selected due to a view input, a voice input, an input using an external device, a selection input with respect to preinput information, or the like. However, the present disclosure is not limited thereto.

When the second schedule tag 2001 is selected, the mobile terminal 100 may display detailed schedule information 2002 corresponding to the second schedule tag 2001. The mobile terminal may display the detailed schedule information 2002 on a separate window. The mobile terminal 100 may display the detailed schedule information 2002 by using a text. The mobile terminal 100 may display the detailed schedule information 2002 to overlap the clock GUI.

The mobile terminal 100 may display a sender of second schedule information, a schedule place, schedule time, contact information of the other party, a theme of a schedule, etc. on the detailed schedule information 2002 corresponding to the second schedule tag 2001.

Figure 21:
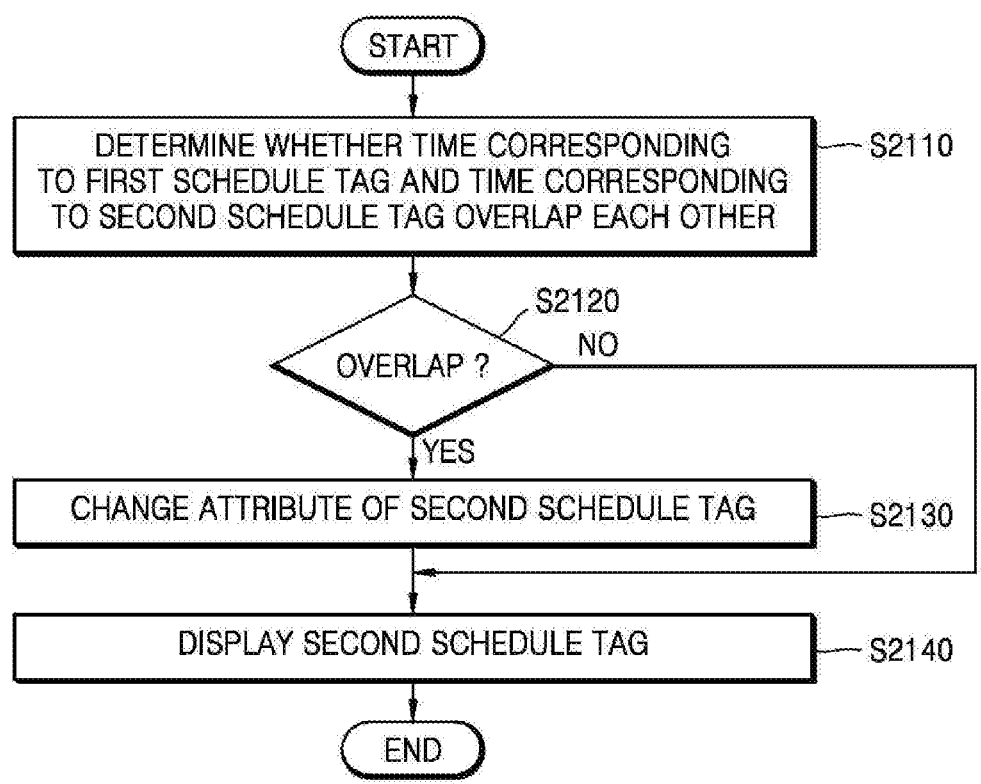
FIG. 21 illustrates a flowchart of a case in which time corresponding to schedule information obtained from a mobile terminal of another user overlaps time corresponding to schedule information of a user, according to an embodiment.

FIG. 21 illustrates a flowchart of a case in which time corresponding to schedule information obtained from a mobile terminal of another user overlaps time corresponding to schedule information of a user, according to an embodiment.

In operation S2110, the mobile terminal 100 may determine whether time corresponding to a first schedule tag and time corresponding to a second schedule tag overlap each other.

The mobile terminal 100 may check whether schedule information obtained from a mobile terminal of another user overlaps previously-obtained schedule information. The mobile terminal 100 may determine an overlap by comparing schedule time information corresponding to a previously-generated first schedule tag with schedule time information corresponding to a newly-generated second schedule tag. The mobile terminal 100 may determine a temporal overlap by analyzing a time location at which the first schedule tag is displayed and a time location at which the second schedule tag is displayed.

In operation S2120, as a result of comparing the schedule time information corresponding to the first schedule tag with the schedule time information corresponding to the second schedule tag, if they overlap, the mobile terminal 100 may perform operation S2130. If the two pieces of schedule time information do not overlap, the mobile terminal 100 may perform operation S2140.

In operation S2130, because the schedule time information corresponding to the first schedule tag and the schedule time information corresponding to the second schedule tag overlap each other, the mobile terminal 100 may change an attribute of the second schedule tag. The mobile terminal 100 may change the attribute of the second schedule tag so as to notify the user that the first schedule tag and the second schedule tag are displayed in a same timeslot.

For example, the mobile terminal 100 may change a color of the second schedule tag. In more detail, the mobile terminal 100 may change a color of a portion of the second schedule tag, the porting overlapping the first schedule tag. The user may easily recognize overlapping schedule time by checking the tag with the changed color. However, the present disclosure is not limited thereto.

In operation S2140, the mobile terminal 100 may display the second schedule tag. The mobile terminal 100 may simultaneously display the first schedule tag and the second schedule tag, thereby notifying at one time a plurality of pieces of schedule information set by a plurality of users. Alternatively, the mobile terminal 100 may display both schedule information of the other user and user information of the mobile terminal 100, thereby allowing the user of the mobile terminal 100 to clearly recognize schedules.

Figure 22:
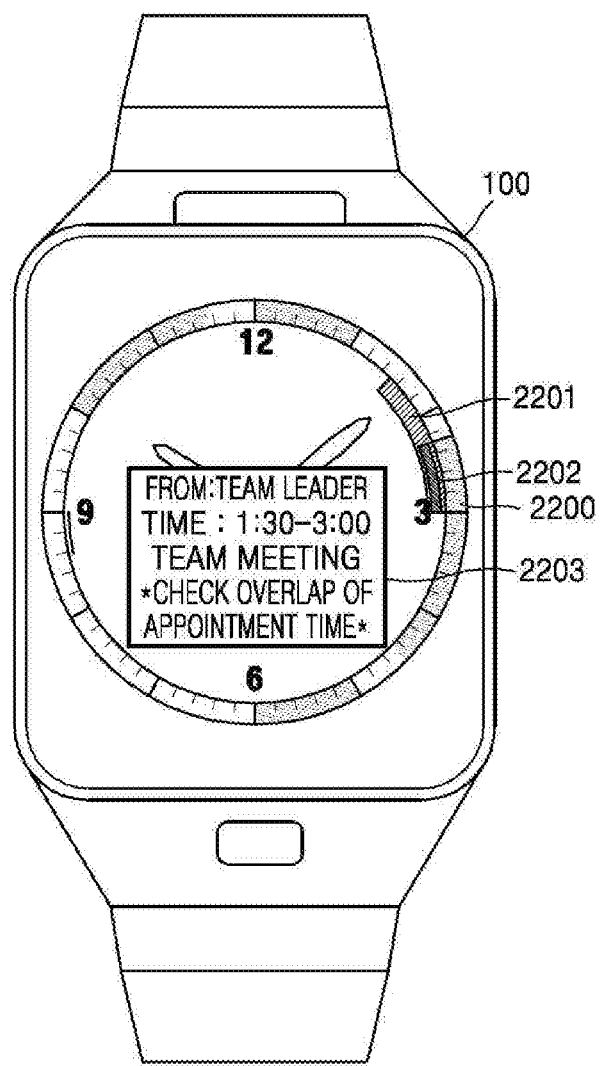
FIG. 22 is a diagram illustrating a screen of the mobile terminal 100 of a case in which time corresponding to schedule information obtained from a mobile terminal of another user overlaps time corresponding to schedule information of a user, according to an embodiment.

FIG. 22 illustrates a screen of the mobile terminal 100 of a case in which time corresponding to schedule information obtained from a mobile terminal of another user overlaps time corresponding to schedule information of a user, according to an embodiment.

As illustrated in FIG. 22, when time of second schedule information obtained from the mobile terminal of the other user overlaps time of existing first schedule information, the mobile terminal 100 may change and display an attribute of a schedule tag.

According to the present embodiment, referring to FIG. 22, the mobile terminal 100 may display a second schedule tag 2201 on the screen whereon an existing first schedule tag 2200 is displayed. For example, the second schedule tag 2201 may be displayed in a time section from 1:30 to 3:30.

If there is an overlap between the first schedule tag 2200 and the second schedule tag 2201, the mobile terminal 100 may recognize the overlap as an overlap tag 2202. The mobile terminal 100 may change and display an attribute of the overlap tag 2202.

For example, the mobile terminal 100 may change and display the attribute of the overlap tag 2202, the attribute including a color, a shape, brightness, a level of opacity, a size, or the like. In addition, the mobile terminal may display an overlap of a schedule time by making the overlap tag 2202 flicker.

In addition, the mobile terminal 100 display a notification by using a visual notification, an acoustic notification, or a tactile notification with respect to the overlap tag 2202.

According to the present embodiment, the mobile terminal 100 may visually notify an overlap of schedule time by displaying a separate window on the screen. The mobile terminal 100 may particularly display a reason of the overlap of the schedule time by using a text. However, the present disclosure is not limited thereto.

In addition, the mobile terminal 100 may set a priority order with respect to authority set for the other user. The mobile terminal 100 may change and display an attribute of a schedule tag corresponding to authority, according to the priority order with respect to authority. For example, when the user determined that schedule information of the user has priority over schedule information obtained from the other user, brightness of the first schedule tag 2200 may be greater than brightness of the second schedule tag 2201. However, the present disclosure is not limited thereto.

Figure 23:
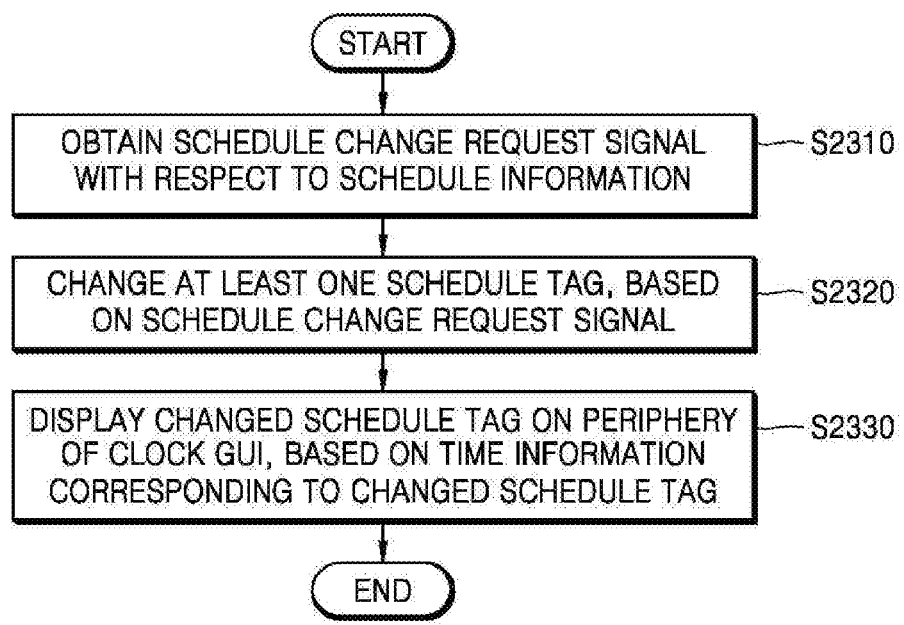
FIG. 23 illustrates a flowchart of a case in which, when schedule information is changed in the mobile terminal, a schedule tag is changed and displayed, according to an embodiment.

FIG. 23 illustrates a flowchart of a case in which, when schedule information is changed in the mobile terminal 100, a schedule tag is changed and displayed, according to an embodiment.

In operation S2310, the mobile terminal 100 may obtain a schedule change request signal with respect to schedule information.

The schedule change request signal with respect to schedule information may be directly input to the mobile terminal 100. Alternatively, the schedule change request signal with respect to schedule information may be obtained from another external device or an external server.

In operation S2320, the mobile terminal 100 may change at least one schedule tag, based on the schedule change request signal.

The mobile terminal 100 may determine a schedule tag corresponding to changed schedule information. The mobile terminal 100 may change an attribute of the determined schedule tag. The mobile terminal 100 may change at least one of a size, a shape, a form, a pattern, brightness, and a level of opacity of the schedule tag to correspond to the changed schedule information.

In operation S2330, the mobile terminal 100 may display the changed schedule tag on the periphery of the clock GUI, based on time information corresponding to the changed schedule tag.

The changed schedule tag may be displayed based on time shown in the clock GUI. The changed schedule tag may be displayed on the periphery of the clock GUI, based on the changed schedule information.

According to the present embodiment, the mobile terminal 100 may receive a user input of moving a schedule tag. The mobile terminal 100 may move the schedule tag according to the received user input. A location of the schedule tag on the periphery of the clock GUI may be changed. Schedule information of the schedule tag may be changed based on changed time of the clock GUI.

Figure 24:
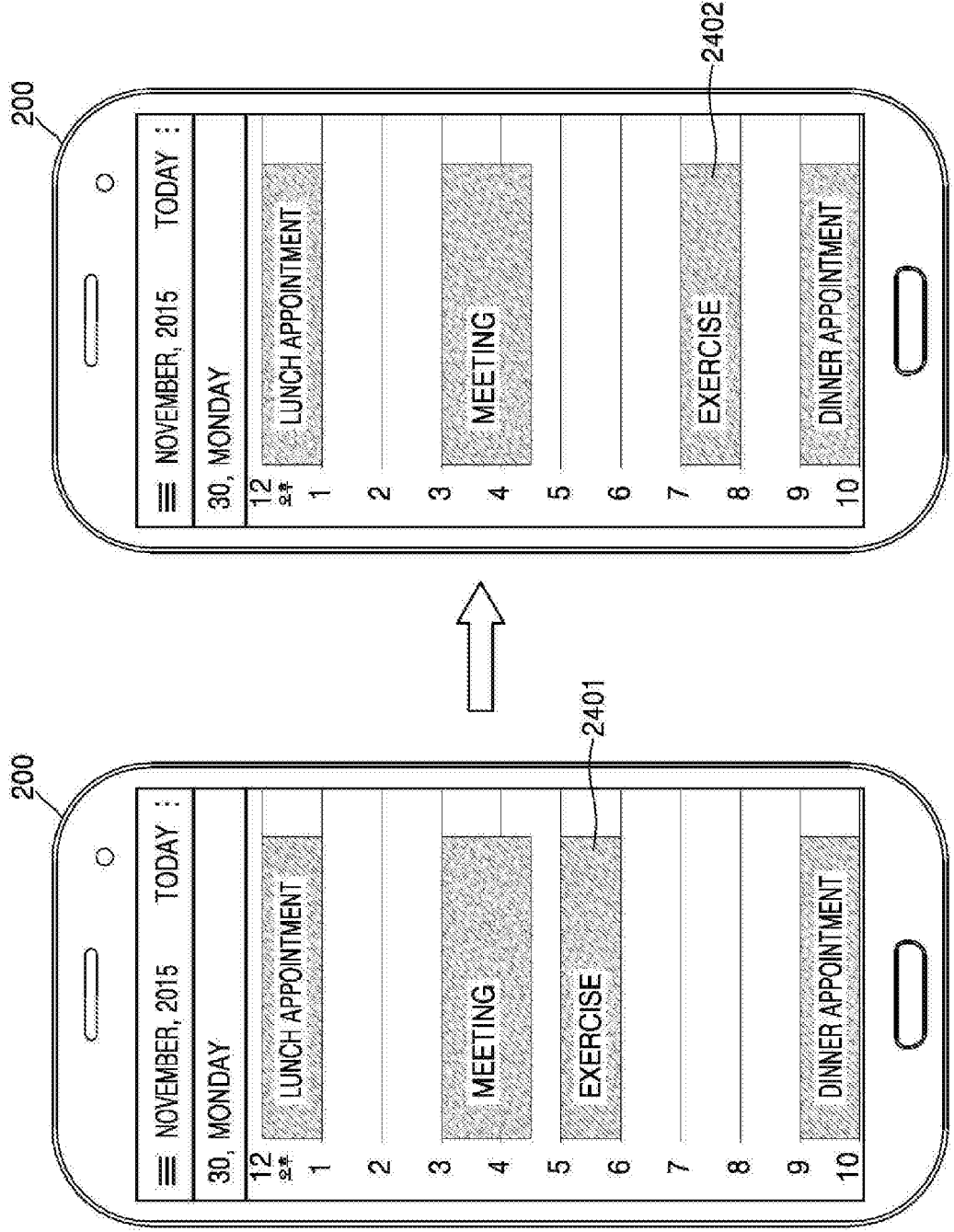
FIGS. 24 and 25 are diagrams illustrating a case in which, when a schedule tag is changed in the mobile terminal, the schedule tag is changed and then is displayed, according to an embodiment.
Figure 25:
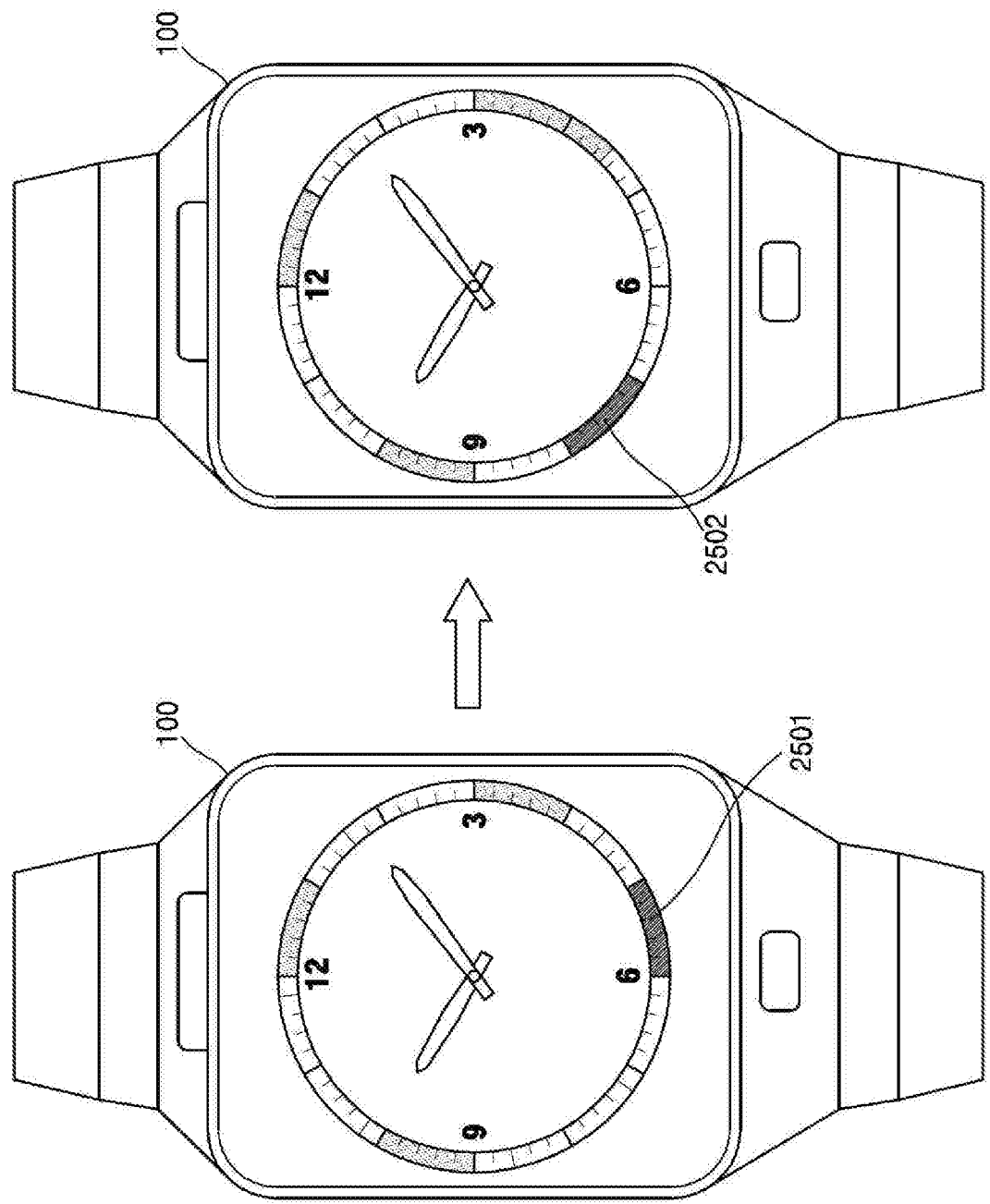

FIGS. 24 and 25 illustrate a case in which schedule information is changed in the mobile terminal 100, according to an embodiment.

FIG. 24 illustrates an external device in which schedule information has been changed. The changed schedule information may be transmitted from the external device to the mobile terminal 100.

According to the present embodiment, an external device 200 may be a mobile device. The external device 200 may change a schedule of a user by using a schedule application.

For example, the external device 200 may change an exercise schedule 2401 which was set from 5:00 p.m. to 6:00 p.m. to an exercise schedule 2402 from 7:00 p.m. to 8:00 p.m.

The mobile terminal 100 may obtain changed schedule information via communication with the external device 200.

FIG. 25 illustrates a case in which a schedule tag has been moved in the mobile terminal 100 according to a changed schedule. What are changed in the schedule in FIG. 25 are the same as those described with reference to FIG. 24.

Referring to FIG. 25, before a schedule is changed, the mobile terminal 100 may display a schedule tag 2501 between 5:00 p.m. and 6:00 p.m., based on the obtained schedule information.

In addition, based on the changed schedule, the mobile terminal 100 may display a schedule tag 2502 between 7:00 p.m. and 8:00 p.m. The schedule tag 2501 that was displayed may be deleted from the screen.

According to another embodiment, the mobile terminal 100 may receive a user input of moving a schedule tag. The mobile terminal 100 may move the schedule tag according to the received user input.

The mobile terminal 100 may change an attribute of the newly-displayed schedule tag 2502. The mobile terminal 100 may change and display an attribute of a schedule tag so as to notify schedule information corresponding to the newly-added or changed schedule tag.

For example, the mobile terminal 100 may differently display a color of the schedule tag 2502 from a color of another schedule tag, thereby notifying a change in the schedule tag 2502.

Figure 26:
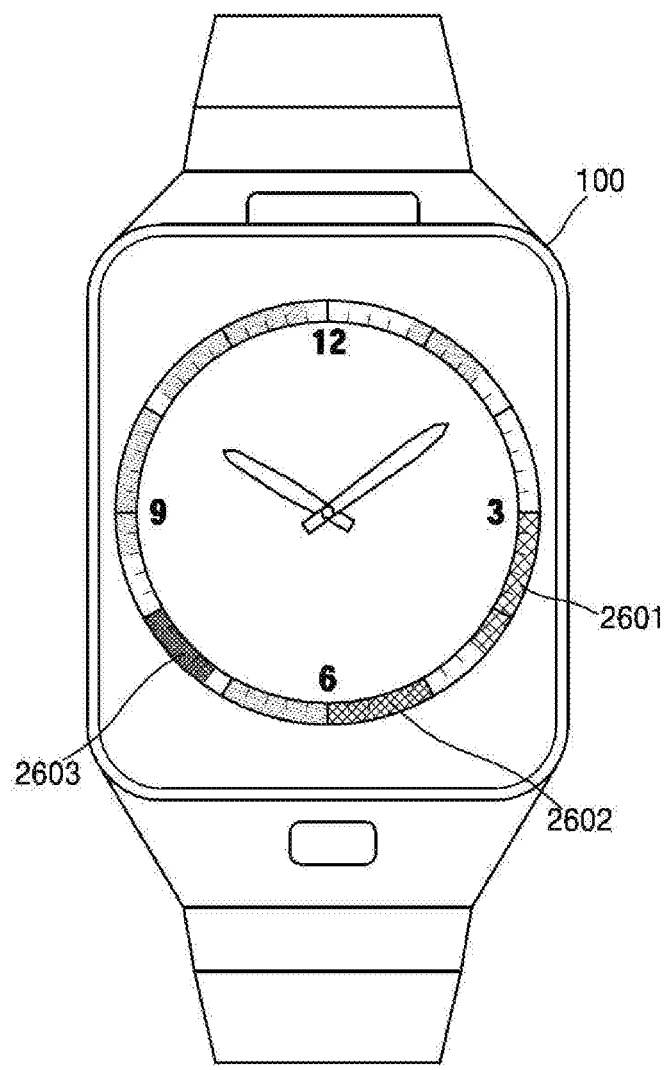
FIG. 26 is a diagram illustrating a case in which attributes of schedule tags are changed according to a priority order of the schedule tags in the mobile terminal, according to an embodiment.

FIG. 26 illustrates a case in which attributes of schedule tags are changed according to a priority order of the schedule tags in the mobile terminal 100, according to an embodiment.

A user or the mobile terminal 100 may set the priority order of the schedule tags. The user or the mobile terminal 100 may set a priority order of a plurality of pieces of schedule information corresponding to the schedule tags. The mobile terminal 100 may set the priority order of the plurality of pieces of schedule information, based on preset priority order information.

The mobile terminal 100 may change an attribute of a schedule tag, based on a determined priority order. The mobile terminal 100 may change and display an attribute of each of a plurality of schedule tags, according to the priority order.

For example, as illustrated in FIG. 26, colors or shapes of a plurality of schedule tags 2601, 2602, and 2603 may be differently displayed.

The user may check the screen of the mobile terminal 100, thereby checking priority order information about user's schedules according to each time.

Figure 27:
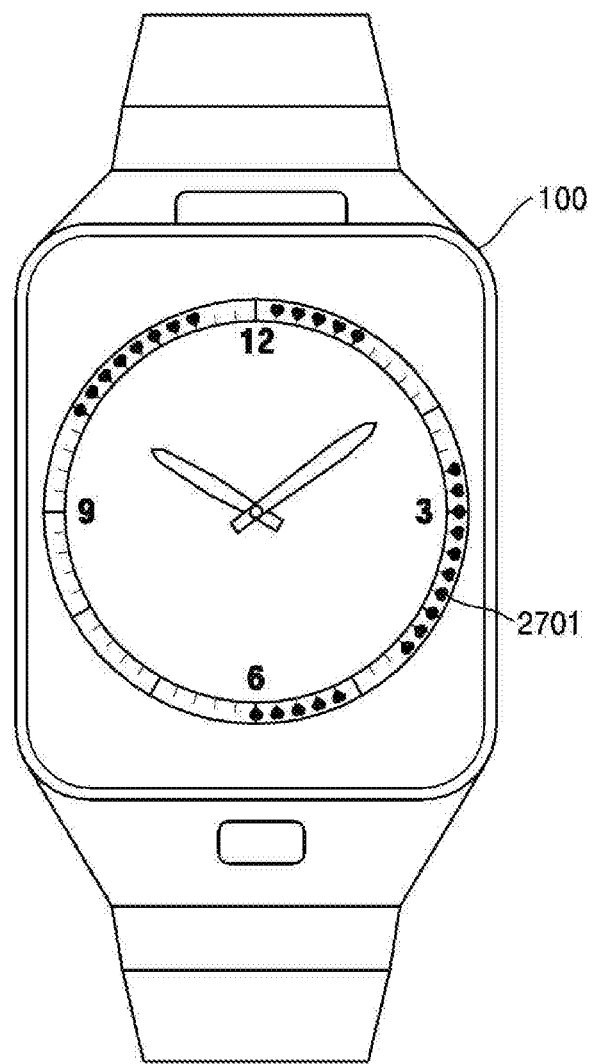
FIG. 27 is a diagram illustrating the screen of the mobile terminal that changes and displays an attribute of a schedule tag when schedule information corresponds to preset event information, according to an embodiment.

FIG. 27 illustrates the screen of the mobile terminal 100 that changes and displays an attribute of a schedule tag when schedule information corresponds to preset event information, according to an embodiment.

The mobile terminal 100 may display the schedule tag according to the schedule information corresponding to the schedule tag. When the schedule information corresponding to the schedule tag corresponds to the preset event information, the mobile terminal 100 may change and display the schedule tag. For example, a color of a schedule tag generated based on schedule information that was set as a predetermined important event may be different from a color of another schedule tag. However, the present disclosure is not limited thereto.

The mobile terminal 100 may display the schedule tag according to a priority order of the schedule information corresponding to the schedule tag and a user preference. For example, when the schedule information is a wedding anniversary, the schedule tag may be formed of hearts.

A shape of the schedule tag may be formed to be a user input shape. The schedule tag may be displayed as a photo, an icon, an image, or the like.

Figure 28:
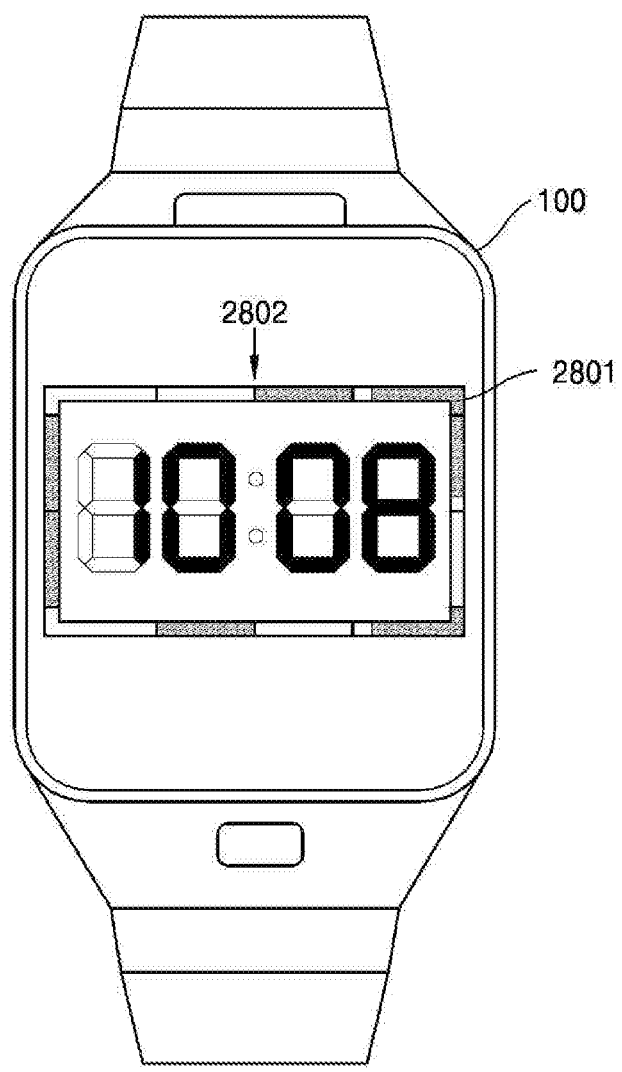
FIG. 28 is a diagram illustrating a case in which a schedule tag is displayed according to a type of the clock GUI displayed on the mobile terminal, according to an embodiment.

FIG. 28 illustrates a case in which a schedule tag is displayed according to a type of the clock GUI displayed on the mobile terminal 100, according to an embodiment.

The clock GUI may correspond to one of an analog clock GUI, a digital clock GUI, and other clock GUI. In this regard, a shape of the clock GUI is not limited thereto.

Referring to FIG. 28, the clock GUI may be a digital clock that does not have a clock dial.

On the digital clock, numbers each meaning time and hands of a clock are not displayed. The digital clock shows time by using digitized numbers.

The mobile terminal 100 may display a schedule tag 2801 on a periphery of a part on which the digitized numbers are displayed. A schedule tag may be displayed to surround the digitized numbers. According to the present embodiment, the periphery on which a schedule tag is to be displayed may be twelve-sectioned objects.

For example, the mobile terminal 100 may display a rectangular object on the periphery of the digitized numbers so as to surround the digitized numbers. The rectangular object may be sectioned by twelve lines. In this regard, a gap between two lines may mean one hour. The gap between two lines may correspond to a gap between two numbers in an analog clock.

In FIG. 28, a center marking line 2802 that is displayed at a top center of the rectangular object may be an object that represents 12 o'clock in an analog clock. In more detail, the schedule tag 2801 may be displayed on an upper right part of the rectangular object. When the center marking line 2802 is defined as 12 o'clock, it is possible to check that the schedule tag 2801 corresponds to a schedule between one o'clock and three o'clock.

Figure 29:
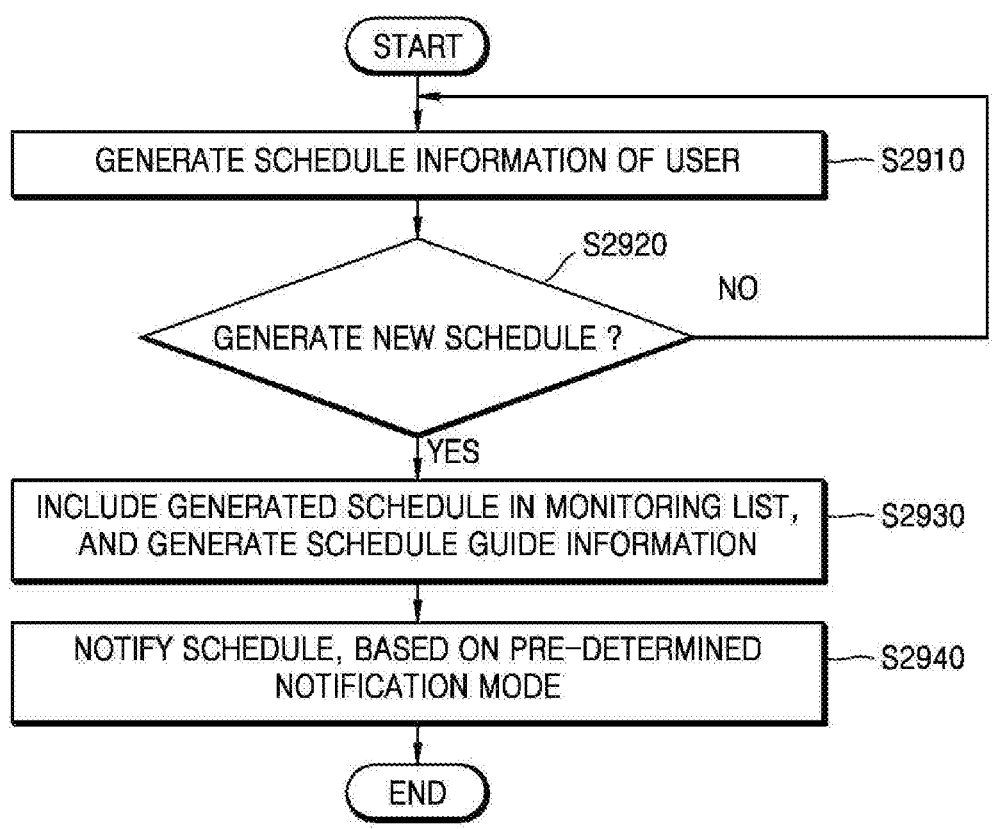
FIG. 29 illustrates a flowchart of a method of generating schedule information of a user and notifying a schedule, the method being performed by the mobile terminal, according to an embodiment.

FIG. 29 illustrates a flowchart of a method of generating schedule information of a user and notifying a schedule, the method being performed by the mobile terminal 100, according to an embodiment.

According to the present embodiment, when the mobile terminal 100 starts a schedule management function, a schedule may be shown on the displayed clock GUI. For example, when schedule information of a user is obtained from the user or an external device, the schedule information may be shown in a manner that a schedule tag is attached on a pattern of the clock GUI. Thus, the mobile terminal 100 may generate schedule notification information according to the schedule information of the user, and may notify the schedule according to a pre-input notification mode.

In operation S2910, the schedule information of the user may be generated based on an input of a schedule signal. In this case, the schedule signal may be directly input to the mobile terminal 100 by the user. In addition, the schedule signal may be received from the external device to the mobile terminal 100.

Operation S2920 may further include comparing previously-generated schedule information with newly-input schedule information so as to check whether there is an overlap in schedule information. In this regard, when there is the overlap in the schedule information, the newly-input schedule information may be deleted, and the previously-generated schedule information may be maintained. Alternatively, the previously-generated schedule information may be deleted, and the newly-input schedule information may be replaced therein. The deletion may be determined according to user selection.

In operation S2920, it is determined whether the schedule generated in operation S2910 is a newly-generated schedule or a previously-generated schedule.

In this regard, if the schedule determined in operation S2910 is the previously-generated schedule, the method may return to operation S2910.

However, if the schedule that is finally determined in operation S2910 is a new schedule, the schedule may be registered in a monitoring list. The monitoring list may refer to an object displayed on the periphery of the clock GUI.

In addition, in operation S2930, the mobile terminal 100 may generate notification information to notify the schedule.

In this case, the notification information may include the schedule tag and movement guide information with respect to a schedule place.

The schedule tag may be displayed on a pre-input area of the clock GUI displayed on the mobile terminal 100. The movement guide information may be generated based on a current location of the user, arrival information, time information, contact information of the other party with whom there is an appointment, or the like.

In this regard, the monitoring list may be generated based on 24-hour time. In addition, the monitoring list may be generated distinguishing between the morning and the afternoon.

In operation S2940, the mobile terminal 100 may notify the schedule, based on the pre-determined notification mode.

For example, the mobile terminal 100 may change a pattern to be displayed on the clock GUI so as to notify the schedule. The clock GUI may be an analog dial including an hour hand, a minute hand, and a second hand, or an electronic dial showing numbers.

Furthermore, in operation S2940, the mobile terminal 100 may change a method of notifying a schedule, according to a physical state of the user or a result of sensing an environment of the mobile terminal 100. For example, when the mobile terminal 100 senses that the user is in a sleep state or a quiet environment, the mobile terminal 100 may output a notification with a volume lower than that of a preset volume. Alternatively, the mobile terminal 100 may output vibration having weaker strength than that of preset vibration. According to another embodiment, when the mobile terminal 100 senses a noisy environment, the mobile terminal 100 may output a notification with a volume higher than that of the preset volume or may output vibration that is stronger than the preset vibration.

Figure 30:
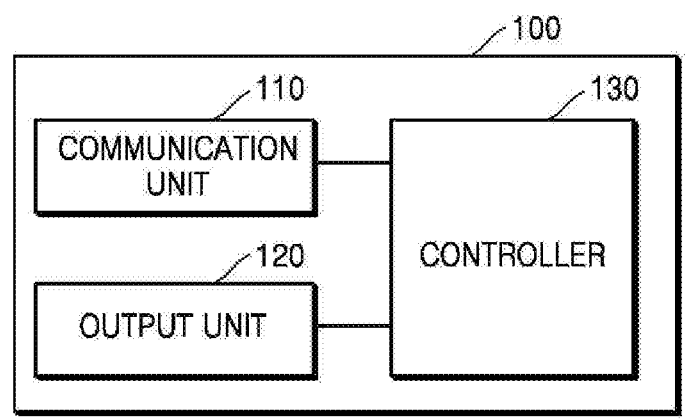
FIGS. 30 and 31 are functional block diagrams illustrating configuration of the mobile terminal, according to an embodiment.
Figure 31:
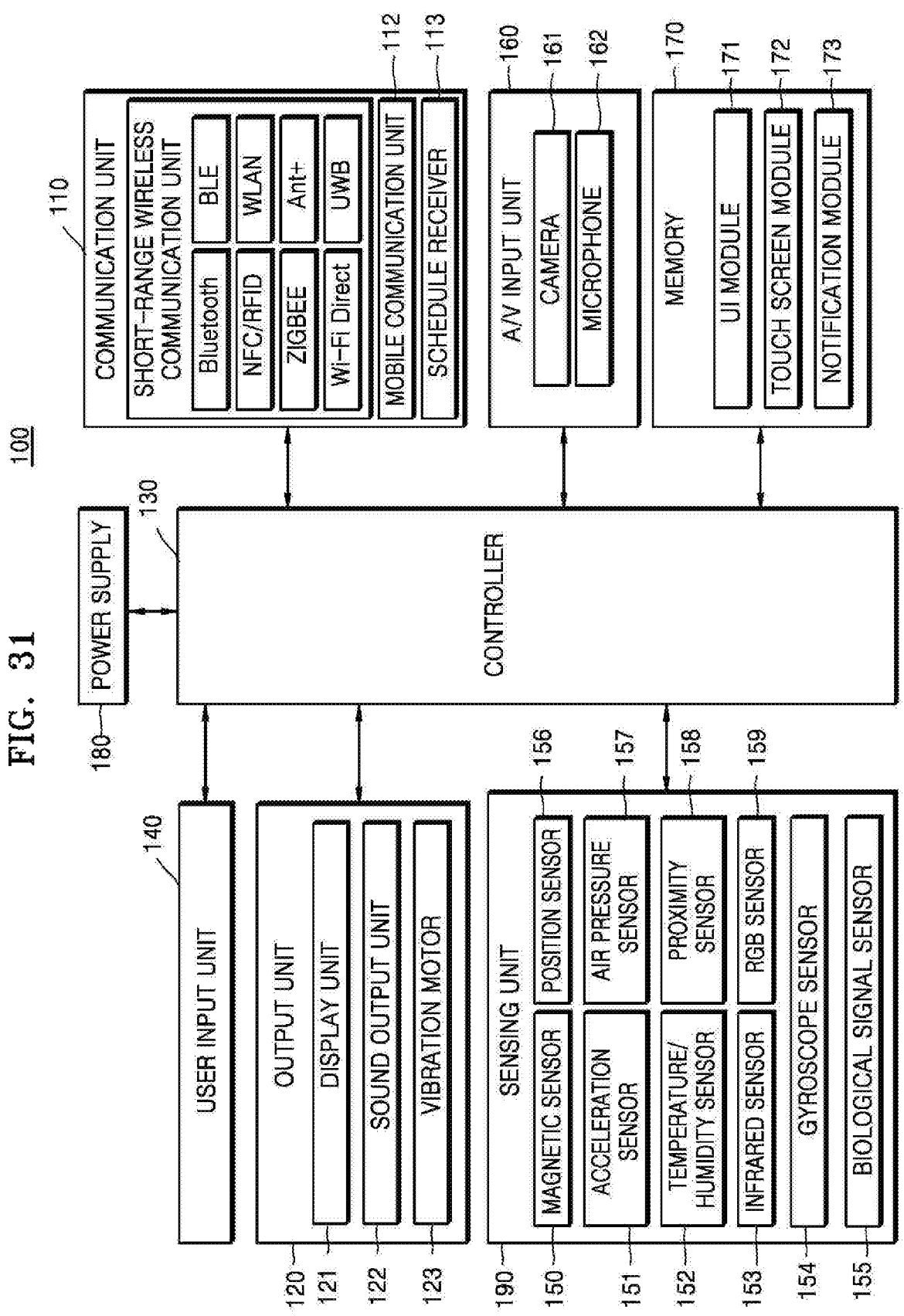

FIGS. 30 and 31 are functional block diagrams illustrating configuration of the mobile terminal 100, according to an embodiment.

As illustrated in FIG. 30, the mobile terminal 100 may include a communication unit 110, an output unit 120, and a controller 130. However, not all elements illustrated in FIG. 30 are necessary elements of the mobile terminal 100. That is, the mobile terminal 100 may be embodied with more elements than the elements illustrated in FIG. 30 or may be embodied with fewer elements than the elements illustrated in FIG. 30.

For example, as illustrated in FIG. 31, the mobile terminal 100 may further include a user input unit 140, a sensing unit 190, an audio/video (A/V) input unit 160, and a memory 170, in addition to the communication unit 110, the output unit 120, and the controller 130.

The communication unit 110 may include one or more elements allowing communication between the mobile terminal 100 and an external device or a server. For example, the communication unit 110 may include a short-range wireless communication unit, a mobile communication unit 112, and a schedule receiver 113.

The short-range wireless communication unit 111 may include, but is not limited to, a Bluetooth communication unit, a Bluetooth Low Energy (BLE) communication unit, a near field communication (NFC) unit, a WLAN (Wi-Fi) communication unit, a ZigBee communication unit, an infrared Data Association (IrDA) communication unit, a Wi-Fi Direct (WFD) communication unit, an ultra wideband (UWB) communication unit, and an Ant+ communication unit.

The mobile communication unit 112 exchanges a wireless signal with at least one of a base station, an external terminal, and a server on a mobile communication network. The wireless signal may include various types of data according to communication of a sound call signal, a video call signal, or a text/multimedia message.

The schedule receiver 113 may obtain schedule information indicating a schedule of a user. The communication unit 110 may obtain the schedule information of the user from an external device, a user input, an external server, or the like.

The user input unit 140 refers to a unit through which the user inputs a signal to control the mobile terminal 100. For example, the user input unit 140 may include, but is not limited to, a key pad, a dome switch, a touch pad (a touch capacitive-type touch pad, a pressure resistive-type touch pad, an infrared beam sensing-type touch pad, a surface acoustic wave-type touch pad, an integral strain gauge-type touch pad, a piezoelectric effect-type touch pad, or the like), a jog wheel, and a jog switch.

The user input unit 140 may receive a user input of selecting a schedule tag displayed on the mobile terminal 100. In addition, the user input unit 140 may receive a user input of inputting the schedule information.

The controller 130 generally controls all operations of the mobile terminal 100. For example, the controller 130 may control the user input unit 140, the output unit 120, the sensing unit 190, the communication unit 110, and the A/V input unit 160 by executing programs stored in the memory 170.

The controller 130 may generate at least one schedule tag, based on time information stored in the schedule information of the user. In addition, the controller 130 may display the clock GUI on the screen of the mobile terminal 100, and may display the schedule tag on the periphery of the displayed clock GUI, based on time information corresponding to the schedule tag.

In addition, the controller 130 may change an attribute of the displayed schedule tag, according to the time information corresponding to the displayed schedule tag, and current time. The controller 130 may display the changed schedule tag.

The output unit 120 may output an audio signal, a video signal, or a vibration signal, and may include a display unit 121, a sound output unit 122, and a vibration motor 123.

The display unit 121 may display and output information processed by the mobile terminal 100. For example, the display unit 121 may display the clock GUI and may display the schedule tag on the periphery of the clock GUI. In addition, the display unit 121 may display detailed schedule information corresponding to the schedule tag. In addition, the display unit 121 may visually output a notification about the schedule tag.

When the display unit 121 and a touch pad form a mutual layer structure and then are formed as a touch screen, the display unit 121 may be used as both an output device and input device. The display unit 121 may include at least one of a liquid crystal display (LCD), a thin film transistor-liquid crystal display (TFT-LCD), an organic light-emitting diode (OLED) display, a flexible display, a three-dimensional (3D) display, and an electrophoretic display.

According to a type of the mobile terminal 100, the mobile terminal 100 may include at least two display units 121. Here, the at least two display units 121 may be disposed to face each other by using a hinge. Alternatively, the at least two display units 121 may be respectively arranged at both surfaces of the mobile terminal 100. However, the present disclosure is not limited thereto.

The sound output unit 122 may output audio data that is received from the communication unit 110 or is stored in the memory 170. The sound output unit 122 may also output a sound signal (e.g., a schedule receiving sound, a message receiving sound, a notifying sound, or the like) related to capabilities performed by the mobile terminal 100. The sound output unit 122 may include a speaker, a buzzer, or the like.

The vibration motor 123 may output a vibration signal. For example, the vibration motor 123 may output the vibration signal that corresponds to an output of the audio data (e.g., the schedule receiving sound, the message receiving sound, or the like) or video data. When a touch is input to the touch screen, the vibration motor 123 may output a vibration signal.

The A/V input unit 160 may receive an input of an audio signal or a video signal and may include a camera 161 and a microphone 162. The camera 161 may obtain an image frame such as a still image or a moving picture via an image sensor during a video call mode or an image-capturing mode. An image that is captured via the image sensor may be processed by the controller 130 or a separate image processing unit (not shown).

The image frame that is processed by the camera 161 may be stored in the memory 170 or may be transmitted to an external source via the communication unit 110. According to a configuration of the mobile terminal 100, two or more cameras 161 may be arranged.

The microphone 162 may receive an input of an external sound signal and may process the received sound signal into electrical voice data. For example, the microphone 162 may receive a sound signal from an external device or a speaker. In order to remove noise that occurs while the sound signal is being externally input, the microphone 162 may use various noise removing algorithms.

A global position system (GPS) receives a plurality of pieces of position information from a plurality of GPS satellites.

The sensing unit 190 may include, but is not limited to, at least one of a magnetic sensor 150, an acceleration sensor 151, a temperature/humidity sensor 152, an infrared sensor 153, a gyroscope sensor 154, a biological signal sensor 155, a position sensor (e.g., a GPS) 156, an air pressure sensor 157, a proximity sensor 158, and an RGB sensor (i.e., a luminance sensor) 159.

The sensing unit 190 may generate a sensing signal to control an operation of the mobile terminal 100 by sensing a current state of the mobile terminal 100, the current state including whether the mobile terminal 100 is worn or not, a location of the mobile terminal 100, or whether the user contacts the mobile terminal 100. In addition, the sensing unit 190 may perform sensing functions related to whether power is supplied to a power supply unit 180, and an external state of the mobile terminal 100.

The acceleration sensor 151 is a device to transform a change in acceleration in one direction into an electrical signal, and is widely used with developments in microelectromechanical systems (MEMS) technology.

The acceleration sensor 151 may include various types of sensors including a sensor embedded in an airbag system of a car so as to measure acceleration having a large value used to detect a collision, or a sensor to measure acceleration having a very small value used to recognize little motion of a human hand and thus used as an input means of a game, etc. The acceleration sensor 151 is configured in a manner that two axes or three axes are mounted in one package, and according to a usage condition, only a Z-axis may be necessary. Thus, when an X-axis acceleration sensor or a Y-axis acceleration sensor is required, instead of a Z-axis acceleration sensor, an acceleration sensor may be vertically mounted at a main substrate by using a separate fragment substrate.

The proximity sensor 158 detects the existence of an object that approaches the mobile terminal 100 or that exists around the mobile terminal 100, without a mechanical contact. The proximity sensor 158 may detect the proximate object by using a change in an alternating current magnetic field or a change in a static magnetic field, or by using a change rate of capacitance. According to a type of the proximity sensor 158, at least two proximity sensors 158 may be arranged.

A pressure sensor (not shown) may detect whether pressure has been applied to the mobile terminal 100, a level of the pressure, or the like. The pressure sensor may be arranged in a part of the mobile terminal 100 which requires detection of pressure according to a usage environment. In the case where the pressure sensor is arranged in the display unit 121, according to a signal output from the pressure sensor, it is possible to distinguish between a touch input via the display unit 121 and a pressure touch input to which greater pressure than the touch input is applied. In addition, it is possible to check a level of pressure applied to the display unit 121 via a pressure touch input, according to a signal output from the pressure sensor.

The gyroscope sensor 154 is a sensor to measure angular acceleration and may sense a direction with respect to a reference direction.

The biological signal sensor 155 may include at least one of an electromyography (EMG) sensor, an electrodermal activity sensor, a skin temperature measurer, a blood volume pulse measurer, an electrocardiogram (ECG) sensor, a respiration sensor, a blood pressure measurer, and a heart rate measurer. The EMG sensor may refer to a sensor to sense action potential of a muscle. The electrodermal activity sensor may refer to a sensor to measure conductivity of skin. The skin temperature measurer may include a sensor to sense temperature of a surface of skin. The blood volume pulse measurer may refer to a device to measure volume of blood flowing through blood vessels. The ECG sensor may refer to a sensor to sense electric potential related to heartbeats on a surface of a body. The respiration sensor may refer to a sensor to measure how many and how fast breathing is occurred. The heart rate measurer may refer to a sensor to count the number of times a heart beats per unit time.

Functions of the sensors may be intuitionally deduced by one of ordinary skill in the art by referring to names of the sensors, and thus, detailed descriptions thereof are omitted here.

The memory 170 may store a program for processing and controlling the controller 130, and may store a plurality of items of data (e.g., an application, writing content, multimedia content, a transcript, etc.) that are input to or output from the mobile terminal 100.

The memory 170 may include a storage medium of at least one type of a flash memory, a hard disk, a multimedia card micro-type memory, a card-type memory such as a secure digital (SD) or xD-Picture (xD) card memory, random access memory (RAM), static random access memory (SRAM), read-only memory (ROM), electrically erasable programmable read-only memory (EEPROM), programmable read-only memory (PROM), a magnetic memory, a magnetic disc, and an optical disc. The mobile terminal 100 may run a web storage or a cloud server that performs a storage function of the memory 170 on the Internet.

The programs stored in the memory 170 may be classified into a plurality of modules according to their functions, for example, into a UI module 171, a touch screen module 172, a notification module 173, etc.

The memory 170 may store a program for processing and controlling the controller 130, and may perform a function of temporarily storing a plurality of items of data (e.g., a phonebook, a message, a still image, video, etc.) that are input to or output from the mobile terminal 100.

The memory 170 may include a storage medium of at least one type of a flash memory, a hard disk, a multimedia card micro-type memory, a card-type memory such as an SD or xD card memory, RAM, and ROM. The mobile terminal 100 may run a web storage that performs a storage function of the memory 170 on the Internet.

The UI module 171 may provide a specialized UI or GUI associated with the mobile terminal 100 for each application.

The touch screen module 172 may detect a user's touch gesture on the touch screen and transmit information related to the touch gesture to the controller 130. The touch screen module 172 according to the present embodiment may recognize and analyze a touch code. The touch screen module 172 may be embodied as separate hardware including a controller.

The notification module 173 may deliver, to the controller 130, information notifying a schedule via the mobile terminal 100.

The power supply unit 180 may receive power from an external power source or an internal power source and supply the power necessary for an operation of each element, by the control of the controller 130. In addition, the power supply unit 180 may be a battery to supply power to the mobile terminal 100, and may be detachably combined with the mobile terminal 100 for charging or the like.

The embodiments of the present disclosure can be written as computer programs and can be implemented in general-use digital computers that execute the programs using a non-transitory computer-readable recording medium. In addition, a data structure used in the embodiments of the present disclosure can be written in a non-transitory computer-readable recording medium through various means. The one or more embodiments may be embodied as computer readable code/instructions on a recording medium, e.g., a program module to be executed in computers, which include computer-readable commands. For example, methods that are implemented as software modules or algorithms may be stored as computer readable code or program instructions executable on a non-transitory computer-readable recording medium.

The non-transitory computer-readable recording medium may include any usable medium that may be accessed by computers, volatile and non-volatile medium, and detachable and non-detachable medium. Examples of the non-transitory computer-readable recording medium include, but are not limited to, magnetic storage media (e.g., ROM, floppy disks, hard disks, etc.), optical recording media (e.g., CD-ROMs, or DVDs), etc. Also, the non-transitory computer-readable recording medium may include a computer storage medium and a communication medium.

The non-transitory computer-readable recording media can be distributed over network-coupled computer systems, and data stored in the distributed recording media, e.g., a program command and code, may be executed by using at least one computer.

The particular implementations shown and described herein are merely examples of the disclosure and are not intended to otherwise limit the scope of the disclosure in any way. For the sake of brevity, conventional electronic configurations, control systems, software and other functional aspects of the systems may not be described in detail.

The present disclosure may, however, be embodied in many different forms and should not be construed as being limited to the embodiments set forth herein; rather, these embodiments are provided so that this disclosure will be thorough and complete, and will fully convey the inventive concept to one of ordinary skill in the art. For example, configuring elements that are singular forms may be executed in a distributed fashion, and also, configuring elements that are distributed may be combined and then executed.

While this disclosure has been particularly shown and described with reference to embodiments thereof, it will be understood by one of ordinary skill in the art that various changes in form and details may be made therein without departing from the spirit and scope of the disclosure.

The scope of the disclosure is defined not by the detailed description of the disclosure but by the appended claims, and all differences within the scope will be construed as being included in the present disclosure.

Throughout the specification, terms such as "unit" and "block" indicate a unit for processing at least one function or operation, wherein the unit and the block may be embodied as hardware or software or embodied by combining hardware and software.

The unit and the block may be formed so as to be in an addressable storage medium, or may be implemented by a program executable by a processor.

Throughout the specification, the description "A may include one of a1, a2, and a3" may mean that an exemplary element that may be included in an A element may be a1, a2, or a3.

However, the element that may be included in the A element is not limited to a1, a2, or a3 due to the description. Thus, the element that may be included in the A element should not be exclusively construed as being limited to a1, a2, and a3 excluding other elements that are not specified herein.

The description means that the A element may include a1, may include a2, or may include a3. The description does not mean that elements included in the A element should be selectively determined from a predetermined group. For example, the description should not be construed as being limited to that a1, a2, or a3 selected from a group necessarily including a1, a2, and a3 configures an A component.

Throughout the specification, the description "at least one of a1, a2, and a3" indicates one of "a1", "a2", "a3", "a1 and a2", "a1 and a3", "a2 and a3", and "a1, a2 and a3".

Therefore, the description should not be construed as being limited to that the description "at least one of a1, a2, and a3" means "at least one of a1", "at least one of a2", and "at least one of a3", unless there is a particular description "at least one of a1, at least one of a2, and at least one of a3".

The invention claimed is:

1. A method of notifying a schedule by using a mobile device, the method comprising:
   obtaining new schedule information input by a user;
   determining whether the new schedule information overlaps with preset schedule information in the mobile device;
   in a case that the new schedule information overlaps with the preset schedule information, replacing the preset schedule information with the new schedule information in a monitoring list and generating at least one schedule tag based on time information of the new schedule information of the user, in a case that the new schedule information does not overlap with the preset schedule information, adding the new schedule information to the monitoring list and generating the at least one schedule tag based on the time information of the new schedule information input by the user and based on time information of the preset schedule information;

displaying a clock graphical user interface (GUI) on a screen of the mobile device, the clock GUI comprising a dial, the dial comprising:

one or more hands; and a plurality of time divisions disposed in a circular-shape around a periphery of the dial, each time division among the plurality of time divisions corresponding to a minute or an hour;

displaying, on a periphery of the clock GUI, the at least one schedule tag in the circular-shape at a position corresponding to time divisions associated with time information of the at least one schedule tag among the plurality of time divisions, wherein the at least one schedule tag comprises at least one symbol associated with the new schedule information, wherein the at least one schedule tag and the plurality of time divisions are arranged on a same circumference, and wherein the at least one symbol is displayed on a part of the circumference in which the at least one schedule tag and the plurality of time divisions are arranged; and changing and displaying an attribute of the displayed at least one schedule tag, based on the time information of the displayed at least one schedule tag and a current time, wherein the changing and displaying the attribute of the displayed at least one schedule tag comprises:

changing the at least one symbol to at least one symbol corresponding to a predetermined event when an event indicated by the new schedule information corresponds to the predetermined event; and displaying the at least one schedule tag including the changed at least one symbol corresponding to the predetermined event, wherein the changed at least one symbol corresponding to the predetermined event is displayed on the part of the circumference in which the at least one schedule tag and the plurality of time divisions are arranged.

2. The method of claim 1, wherein the at least one schedule tag is differently displayed based on whether the time information of the at least one schedule tag is morning or afternoon.

3. The method of claim 1, further comprising, when the at least one schedule tag is selected by the user, displaying detailed schedule information corresponding to the at least one schedule tag.

4. The method of claim 1, wherein the changing and displaying of the attribute of the at least one schedule tag comprises changing and displaying at least one of a shape, a size, a color, and a brightness of the at least one schedule tag, based on a type of the schedule of the user.

5. The method of claim 1, wherein the changing and displaying of the attribute of the at least one schedule tag comprises changing and displaying the attribute of the at least one schedule tag when the current time is in a preset range of time corresponding to the displayed at least one schedule tag.

6. The method of claim 5, wherein the changing and displaying of the attribute of the at least one schedule tag comprises sequentially changing the attribute of the at least one schedule tag when the current time approaches the time information corresponding to the displayed at least one schedule tag.

7. The method of claim 1, wherein at least one of a color, a shape, and a brightness of at least one of an hour hand, a minute hand, and a background image in the clock GUI is changed and displayed based on the time information of the displayed at least one schedule tag and the current time.

8. The method of claim 1, further comprising transmitting schedule information corresponding to the at least one schedule tag to an external device having preset authority, based on the time information of the displayed at least one schedule tag and the current time.

9. The method of claim 1, further comprising outputting a notification, based on the time information of the displayed at least one schedule tag, and the current time, wherein the notification comprises at least one of a visual notification, an acoustic notification, and a tactile notification.

10. The method of claim 9, wherein the outputting of the notification comprises:

sensing at least one of a current state of the user and an environment state of the mobile device; and changing an attribute of the notification, based on at least one of the current state of the user and the environment state of the mobile device.

11. The method of claim 1, wherein the changing and displaying of the attribute of the at least one schedule tag comprises:

sensing a current location of the mobile device;

identifying a movement path and a travel time from the current location of the mobile device to an appointment place, based on appointment place information corresponding to the at least one schedule tag;

identifying a time of changing and displaying the attribute of the at least one schedule tag, based on the identified travel time; and changing and displaying the attribute of the displayed at least one schedule tag, based on the identified time.

12. The method of claim 1, wherein the generating of the at least one schedule tag comprises:

obtaining a schedule change request signal with respect to the new schedule information;

changing the at least one schedule tag, based on the schedule change request signal; and displaying the changed at least one schedule tag at the position corresponding to the time divisions, based on time information corresponding to the changed at least one schedule tag.

13. The method of claim 1, further comprising:

displaying a first schedule tag from among the at least one schedule tag generated based on time information comprised in first schedule information of the user, and then obtaining second schedule information of the user from a mobile device of another user which has pre-determined authority;

generating at least one second schedule tag, based on time information comprised in the second schedule information of the user; and displaying the at least one second schedule tag at a second position in the circular-shape corresponding to second time divisions among the plurality of time divisions of the displayed clock GUI, based on the time information of the at least one second schedule tag.

14. The method of claim 13, wherein the position is different from the second position.

15. The method of claim 13, further comprising, when the at least one second schedule tag is selected by the user, displaying detailed schedule information corresponding to the at least one second schedule tag, wherein the detailed schedule information comprises a sender of the second schedule information, a time of the at least one second schedule tag, and a content of the at least one second schedule tag.

16. The method of claim 13, further comprising:

identifying whether the time information of the at least one schedule tag and time information of the at least one second schedule tag overlap; and changing an attribute of the at least one second schedule tag when the time information of the at least one schedule tag and the time information of the at least one second schedule tag overlap.

17. The method of claim 1, wherein the clock GUI is an analog clock GUI.

18. A mobile device for notifying a schedule, the mobile device comprising:

a display; and at least one processor configured to:

obtain new schedule information input by a user;

determine whether the new schedule information overlaps with preset schedule information in the mobile device;

in a case that the new schedule information overlaps with the preset schedule information, replace the preset schedule information with the new schedule information in a monitoring list and generate at least one schedule tag based on time information of the new schedule information of the user, in a case that the new schedule information does not overlap with the preset schedule information, add the new schedule information to the monitoring list and generate the at least one schedule tag based on the time information of the new schedule information input by the user and based on time information of the preset schedule information, control the display to display a clock graphical user interface (GUI) on a screen of the mobile device, the clock GUI comprising a dial, the dial comprising:

one or more hands; and a plurality of time divisions disposed in a circular-shape around a periphery of the dial, each time division among the plurality of time divisions corresponding to a minute or an hour, control the display to display, on a periphery of the clock GUI, the at least one schedule tag in the circular-shape at a position corresponding to time divisions associated with time information of the at least one schedule tag among the plurality of time divisions, wherein the at least one schedule tag comprises at least one symbol associated with the new schedule information, wherein the at least one schedule tag and the plurality of time divisions are arranged on a same circumference, and wherein the at least one symbol is displayed on a part of the circumference in which the at least one schedule tag and the plurality of time divisions are arranged, control the display to display an attribute of the displayed at least one schedule tag, based on the time information of the displayed at least one schedule tag and a current time, change the at least one symbol to at least one symbol corresponding to a predetermined event when an event indicated by the new schedule information corresponds to the predetermined event, and control the display to display the at least one schedule tag including the changed at least one symbol corresponding to the predetermined event, wherein the changed at least one symbol corresponding to the predetermined event is displayed on the part of the circumference in which the at least one schedule tag and the plurality of time divisions are arranged.

19. The mobile device of claim 18, wherein the at least one processor is further configured to control the display to change and display at least one of a shape, a size, a color, and a brightness of the at least one schedule tag, based on a type of the schedule of the user.

* * * * *